United States Patent
Beauchemin

(10) Patent No.: US 12,518,372 B2
(45) Date of Patent: Jan. 6, 2026

(54) SYSTEMS AND METHODS FOR ALIGNMENT AND COMPARISON OF A REFERENCE DRAWING WITH IMAGES OF A PART

(71) Applicant: VISIONx INC., Pointe-Claire (CA)

(72) Inventor: Patrick Beauchemin, Pointe-Claire (CA)

(73) Assignee: VISIONx INC., Pointe-Claire (CA)

( * ) Notice: Subject to any disclaimer, the term of this patent is extended or adjusted under 35 U.S.C. 154(b) by 448 days.

(21) Appl. No.: 18/082,066

(22) Filed: Dec. 15, 2022

(65) Prior Publication Data

US 2023/0206425 A1    Jun. 29, 2023

Related U.S. Application Data

(60) Provisional application No. 63/293,890, filed on Dec. 27, 2021.

(51) Int. Cl.
G06T 7/00 (2017.01)
G06T 7/33 (2017.01)

(52) U.S. Cl.
CPC .............. *G06T 7/001* (2013.01); *G06T 7/337* (2017.01); *G06T 2207/30164* (2013.01)

(58) Field of Classification Search
CPC . G06T 2207/10016; G06T 2207/20081; G06T 2207/20084; G06T 2207/30232;
(Continued)

(56) References Cited

U.S. PATENT DOCUMENTS 8,379,014 B2 * 2/2013 Wiedemann ....... G06V 30/1914
345/428
8,780,223 B2 * 7/2014 Beauchemin ........... G06T 7/001
348/222.1
(Continued)

FOREIGN PATENT DOCUMENTS

EP         1193642 A1 *  4/2002  .......... G06K 9/6203
WO    2020223594 A1   11/2020
WO    2021092696 A1    5/2021

OTHER PUBLICATIONS

Usamentiaga, R., Garc-a, D.F. & Molleda, J. Efficient registration of 2D points to CAD models for real-time applications. J Real-Time Image Proc 15, 329-347 (2018). https://doi.org/10.1007/s11554-015-0485-7 (Year: 2018).*
(Continued)

*Primary Examiner* — Chan S Park
*Assistant Examiner* — Paulo Andres Garcia
(74) *Attorney, Agent, or Firm* — MCANDREWS, HELD & MALLOY, LTD.

(57) ABSTRACT

A system is provided for alignment and comparison of a CAD drawing that includes one or more control sections with multiple images of a part. Each of the multiple images corresponds to a portion of the part and a combination of the multiple images provides a representation of the part as a whole. The system comprises an imaging device for acquiring the multiple images, a memory module for storing the multiple images and associated imaging position data, and a processing module configured to perform an initial alignment of the CAD drawing with the multiple images of the part, determine an initial total alignment adjustment based on the initial alignment and perform one or more alignment iterations until a termination condition is satisfied. The system further comprises an output device for providing a (Continued)

user with an indication of a deviation, based on the alignment between the CAD drawing and the part.

26 Claims, 19 Drawing Sheets

(58) Field of Classification Search
CPC ... G06T 2207/30164; G06T 7/20; G06T 7/60; G06V 20/52; G06V 20/44; G06V 20/20; G06V 30/422; G06V 10/82; G06V 2201/06; G06N 3/08; G06N 3/044; G06N 3/0464; G08B 13/19602
See application file for complete search history.

(56) References Cited

U.S. PATENT DOCUMENTS

| | | | |
|---|---|---|---|
| 8,917,320 B2 | 12/2014 | Beauchemin | |
| 9,183,674 B2* | 11/2015 | Diguet | G06T 19/00 |
| 10,452,949 B2* | 10/2019 | Jia | G06T 7/30 |
| 10,482,621 B2* | 11/2019 | Hoelscher | G06T 19/00 |
| 10,755,401 B2* | 8/2020 | Bian | G06T 7/0004 |
| 2012/0076395 A1 | 3/2012 | Khurana | |
| 2018/0130234 A1* | 5/2018 | Barker | G06T 7/344 |
| 2020/0043186 A1 | 2/2020 | Selviah et al. | |
| 2021/0256674 A1* | 8/2021 | Shreve | G06T 7/001 |

OTHER PUBLICATIONS

P. Wunsch and G. Hirzinger, "Registration of CAD-models to images by iterative inverse perspective matching," Proceedings of 13th International Conference on Pattern Recognition, Vienna, Austria, 1996, pp. 78-83 vol.1, doi: 10.1109/ICPR.1996.545995. (Year: 1996).*

Tolga Birdal, Slobodan Ilic, CAD Priors for Accurate and Flexible Instance Reconstruction, Proceedings of the IEEE International Conference on Computer Vision (ICCV), 2017, pp. 133-142, https://openaccess.thecvf.com/content_iccv_2017/html/Birdal_CAD_Priors_for_ICCV_2017_paper.html (Year: 2017).*

Extended European Search Report Appln. No. 22212278.0 dated May 30, 2023.

* cited by examiner

SYSTEMS AND METHODS FOR ALIGNMENT AND COMPARISON OF A REFERENCE DRAWING WITH IMAGES OF A PART

CROSS REFERENCE TO RELATED APPLICATIONS

This application is a Non-Provisional Patent Application of U.S. Provisional Patent Application No. 63/293,890 entitled "Systems And Methods For Alignment And Comparison Of A Reference Drawing With Images Of A Part" filed Dec. 27, 2021, which is herein incorporated by reference in its entirety.

FIELD

The described embodiments relate to systems and methods for alignment of a Computer Aided Design (CAD) reference drawing with multiple images of a part. Each of the multiple images may correspond to a portion of the part and a combination of the multiple images can provide a representation of the part as a whole.

BACKGROUND

The following is not an admission that anything discussed below is part of the prior art or part of the common general knowledge of a person skilled in the art.

A CAD drawing is a digital file comprising 2D or 3D geometric definitions of an object or a part. The CAD drawing may use elements called entities to specify the geometric definitions. For example, a CAD drawing may include entities like lines, arcs, NURBS/splines, circles, ellipses, etc.

A part may be checked for compliance with a CAD reference drawing. For example, the part may be manufactured based on the geometric definitions included in the CAD drawing. The manufactured part may then be inspected to perform quality control and to ensure that the part meets functional requirements. The inspection process may include comparing the part against the geometric definitions included in the CAD drawing. Compliance may require the part to meet tolerance requirements specified for the geometric definitions.

Conventional optical comparators may use a technique in which the manufactured parts are compared to a scaled printout of their geometric definition, known as an overlay or a transparency. This technique relies heavily on the skill of an operator to properly align the part and the overlay/transparency. Further the overlay/transparency may be in an orientation and magnification level that is not ideally suited to the comparison process. Therefore, conventional optical comparators suffer from disadvantages including low-accuracy and operator-dependent results.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a system for alignment and comparison of a CAD drawing that includes one or more control sections with multiple images of a part, wherein each of the multiple images corresponds to a portion of the part and a combination of the multiple images provides a representation of the part as a whole. The system comprises an imaging device for acquiring the multiple images, wherein each of the multiple images corresponds to at least one control section of the one or more control sections. The system further comprises a memory module for storing the multiple images and imaging position data associated with the multiple images, wherein the imaging position data for each image indicates relative position, during imaging, of the part with respect to the imaging device. Additionally, the system comprises a processing module configured to perform an initial alignment of the CAD drawing with the multiple images of the part, determine an initial total alignment adjustment based on the initial alignment and perform one or more alignment iterations until a termination condition is satisfied. Each alignment iteration comprises, for each of the multiple images of the part, determine a portion of the CAD drawing corresponding to portion of the part visible in that image of the part, and for each control section included in the portion of the CAD drawing: if an alignment adjustment corresponding to that control section has not been determined during that alignment iteration, locate a measurement point on that image of the part corresponding to that control section; and determine the alignment adjustment between the measurement point and that control section. Each alignment iteration comprises changing the total alignment adjustment based on the determined alignment adjustments for that alignment iteration; and determining if the termination condition is satisfied. The system also comprises an output device for providing a user with an indication of a deviation, based on the alignment between the CAD drawing and the multiple images.

In one or more embodiments, the one or more control sections comprise single points at multiple locations.

In one or more embodiments, the one or more control sections comprise multiple points located along a CAD entity, wherein a spacing between the multiple points is based on a resolution of the multiple images.

In one or more embodiments, the initial alignment is based on user input received at an input device.

In one or more embodiments, the initial alignment is automatically performed using pattern matching.

In one or more embodiments, the measurement point is located using pattern matching.

In one or more embodiments, the measurement point is located using a search range corresponding to that control section.

In one or more embodiments, if the alignment adjustment corresponding to that control section has been determined during that alignment iteration and a skip parameter is set, the processing module is further configured to perform weighting of the multiple alignment adjustments corresponding to that control section.

In one or more embodiments, the alignment adjustment between the measurement point and that control section is determined based on a deviation-from-nominal method.

In one or more embodiments, the alignment adjustment between the measurement point and that control section is determined based on a fit-to-tolerance method.

In one or more embodiments, the total alignment adjustment includes a translation adjustment and/or a rotation adjustment.

In one or more embodiments, the alignment iteration termination condition includes a maximum iteration threshold and a minimum total alignment adjustment threshold.

In one or more embodiments, providing the user with the indication of the deviation, based on the alignment, includes verifying, for each control section, if the part is within tolerance bands associated with that control section.

In accordance with a broad aspect, there is provided a method for alignment and comparison of a CAD drawing that includes one or more control sections with multiple images of a part, wherein each of the multiple images corresponds to a portion of the part and a combination of the multiple images provides a representation of the part as a whole. The method comprises receiving the multiple images, wherein each of the multiple images corresponds to at least one control section of the one or more control sections; and storing the multiple images and imaging position data associated with the multiple images, wherein the imaging position data for each image indicates relative position, during imaging, of the part with respect to an imaging device. The method further comprises performing an initial alignment of the CAD drawing with the multiple images of the part; determining an initial total alignment adjustment based on the initial alignment; and performing one or more alignment iterations until a termination condition is satisfied. Each alignment iteration comprises, for each of the multiple images of the part, determining a portion of the CAD drawing corresponding to portion of the part visible in that image of the part, and for each control section included in the portion of the CAD drawing: if an alignment adjustment corresponding to that control section has not been determined during that alignment iteration, locating a measurement point on that image of the part corresponding to that control section; and determining the alignment adjustment between the measurement point and that control section. Each alignment iteration further comprises changing the total alignment adjustment based on the determined alignment adjustments for that alignment iteration; and determining if the termination condition is satisfied. The method also comprises providing a user with an indication of a deviation on an output device, wherein the indication is based on the alignment between the CAD drawing and the multiple images.

In one or more embodiments, the one or more control sections comprise single points at multiple locations.

In one or more embodiments, the one or more control sections comprise multiple points located along a CAD entity, wherein a spacing between the multiple points is based on a resolution of the multiple images.

In one or more embodiments, the initial alignment is based on user input received at an input device.

In one or more embodiments, performing the initial alignment comprises performing the initial alignment automatically using pattern matching.

In one or more embodiments, locating the measurement point comprises using pattern matching.

In one or more embodiments, locating the measurement point comprises using a search range corresponding to that control section.

In one or more embodiments, if the alignment adjustment corresponding to that control section has been determined during that alignment iteration and a skip parameter is set, the method further comprises performing weighting of the multiple alignment adjustments corresponding to that control section.

In one or more embodiments, determining the alignment adjustment between the measurement point and that control section comprises determining the alignment adjustment based on a deviation-from-nominal method.

In one or more embodiments, determining the alignment adjustment between the measurement point and that control section comprises determining the alignment adjustment based on a fit-to-tolerance method.

In one or more embodiments, the total alignment adjustment includes a translation adjustment and/or a rotation adjustment.

In one or more embodiments, the alignment iteration termination condition includes a maximum iteration threshold and a minimum total alignment adjustment threshold.

In one or more embodiments, providing the user with the indication of the deviation comprises verifying, for each control section, if the part is within tolerance bands associated with that control section.

It will be appreciated by a person skilled in the art that a system or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of systems and methods of the teaching of the present specification and are not intended to limit the scope of what is taught in any way.

DESCRIPTION OF EXEMPLARY EMBODIMENTS

Figure 1:
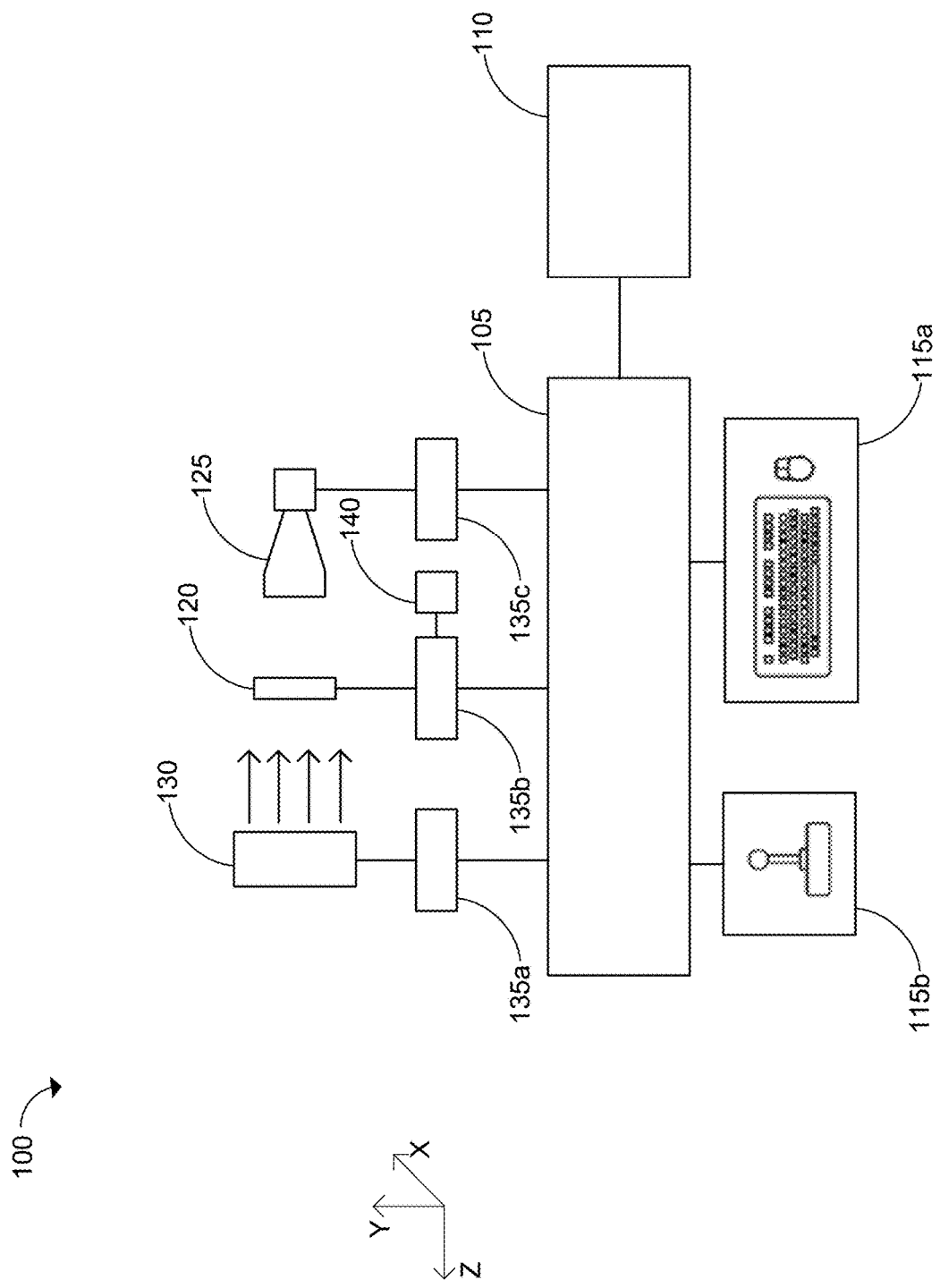
FIG. 1 shows a block diagram of a system for acquiring multiple images of a part and performing alignment of a CAD drawing with the multiple images, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, Embodiments described herein relate to systems and methods for alignment and comparison of a CAD drawing with one or more images of a part. If a part is small enough to fit within the optical field-of-view of the imaging device used, then a single image of the part may include all the relevant features for checking compliance of the part with its CAD drawing. A CAD drawing of the part may be superimposed on the single image and aligned with the image. Based on the alignment, the compliance of the part with its CAD drawing at one or more locations may be determined.

However, if a part is too large to fit within the optical field-of-view of the imaging device used, then multiple images of the part may be required to capture all the relevant features of the part. In some examples, a part may fit within the optical field-of-view at a low optical magnification level. But for parts required to be manufactured with high accuracy, high optical magnification levels may be required to check compliance with tight tolerance limits. Higher optical magnification levels may result in a reduced optical field-of-view and therefore multiple images may be required to capture all relevant features of the part. In some cases, a part's height or depth may be greater than the imaging device's depth-of-view. Multiple images along a "Z" or depth axis may be required to capture all relevant features of the part.

Each of the multiple images may correspond to a portion of the part and a combination of the multiple images may provide a representation of the part as a whole. The CAD drawing may be aligned using a single image and the alignment may then be used to perform compliance measurements for the multiple images. However, in this case, the alignment between the CAD drawing and the part may deteriorate for one or more of the multiple images. This may cause erroneous results in determining compliance, as described in further detail herein below with reference to FIG. 9B.

The described embodiments enable the alignment of the CAD drawing with multiple images of a part. After the alignment is completed, the described embodiments may automatically determine compliance of the part with its CAD data, to within user-specified tolerances, at one or more specific locations or across the entire geometric definition of the part. Accordingly, the described embodiments enable alignment (and subsequent compliance determination) for cases where multiple images of a part are required, for example, because of the imaging device's field-of-view or depth-of-field limitations.

The described embodiments can be implemented in a manufacturing process, where each part, or portion of a part, can be inspected as they move along a production line. The described embodiments may be operatively connected to a control system to reject parts that are outside of tolerance values. Accordingly, the described embodiments could increase the manufacturing throughput because parts would not be required to be removed from the production line for inspection.

Referring now to FIG. 1, shown therein is a block diagram 100 of a system for acquiring multiple images of a part and performing alignment of a CAD drawing with the multiple images, in accordance with an example embodiment. Block diagram 100 includes a control unit 105, an output device 110, input devices 115a and 115b, the part 120, an imaging device 125, an illumination source 130, stages 135a-135c and an encoder 140.

Illumination source 130, part 120, and imaging device 125 are mounted using stage 135a, stage 135b, and stage 135c respectively. In some embodiments, a single combined stage may be used for mounting the illumination source 130, part 120, and imaging device 125. One or more of stages 135a-135c may be capable of controlled movement to provide relative motion between part 120 and imaging device 125. One or more of stages 135a-135c may include a motor assembly to provide controlled movement in one or more of x, y, and z directions. Control unit 105 may provide the control commands to control the stage movement. In some embodiments, the controlled movement of one or more of stages 135a-135c may be manual.

One or more encoders may be used to measure the movement of stages 135a-135c. For example, encoder 140 may provide imaging position data to control unit 105 indicating relative position, during imaging, of part 120 with respect to imaging device 125.

Illumination source 130 may illuminate part 120 while imaging device 125 captures multiple images of part 120. In some embodiments, control unit 105 may provide control commands to control illumination source 130 for providing uniform and reproducible illumination of part 120 during imaging.

Imaging device 125 may capture a stream of high-resolution digital images of part 120. The high-resolution digital images may be captured at different relative x, y, z positions of part 120 with respect to imaging device 125. In some embodiments, imaging device 125 may capture high-resolution still images.

Output device 110 may include a display, for example a LED or LCD based display. In some embodiments, output device 110 may include a touch sensitive display that supports gestures. Output device 110 may provide displays of one or more of the multiple images, the CAD drawing, an overlay of the CAD drawing or a portion of the CAD drawing with one or more of the multiple images and an indication of compliance of the part with its CAD data. In some embodiments, output device 110 may provide a real-time display of a video of part 120 captured by imaging device 125 at the full framerate of the captured video. Output device 110 may provide a display of the multiple images in full 1:1 resolution, i.e., every pixel in the image is displayed using one pixel of output device 110. In some embodiments, output device 110 may be integrated into control unit 105.

Input devices 115a and 115b may include one or more of a mouse, a keyboard, a touch-sensitive screen, a thumb-wheel, a trackpad and a trackball. In some embodiments, some of these components can be integrated with one another. A user may provide various user inputs to control unit 105 using one or more input devices 115a-115b. In some embodiments, input devices 115a and 115b may be integrated into control unit 105.

Figure 2:
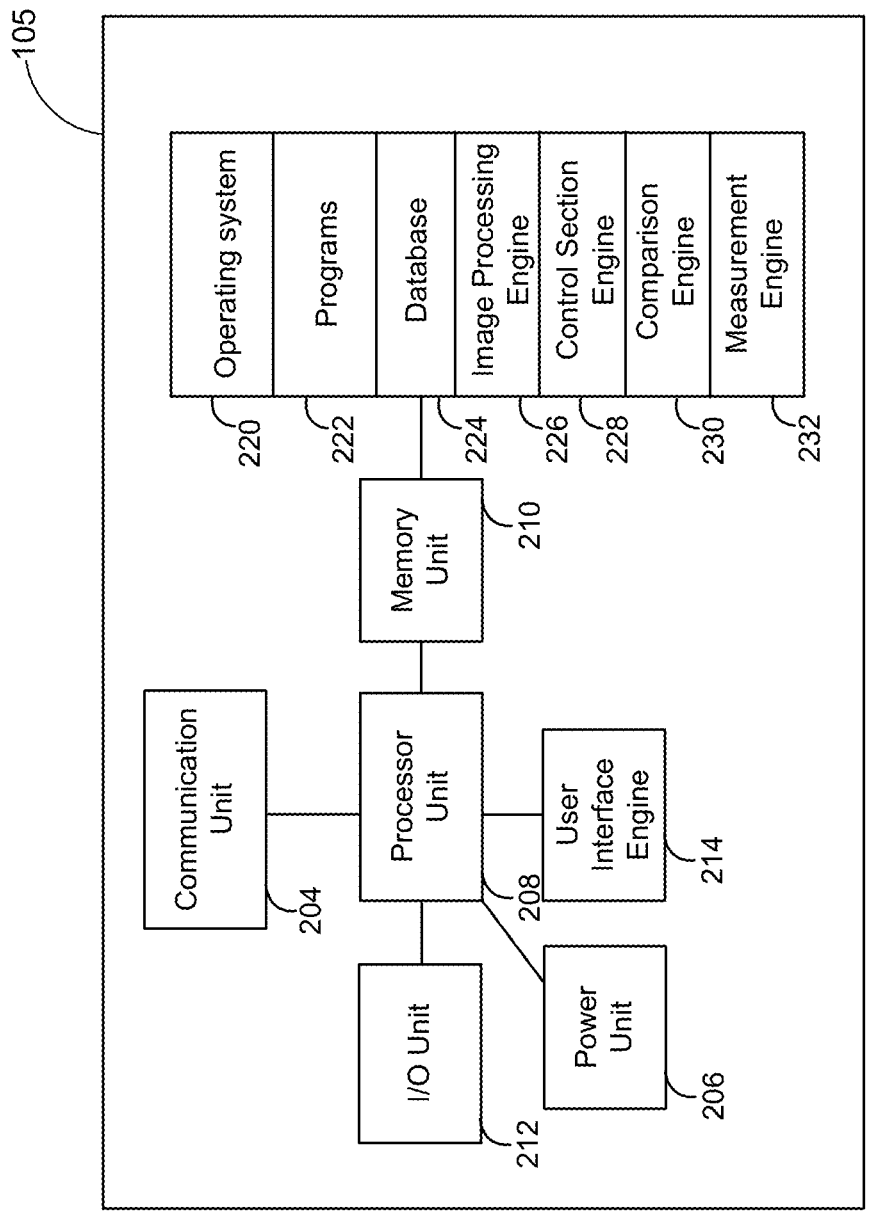
FIG. 2 shows a block diagram of a control unit in accordance with an example embodiment.

Referring now to FIG. 2, there is shown a block diagram of control unit 105 in accordance with an example embodiment. Control unit 105 may include a personal computer, a workstation, a server, a portable computer, or a combination of these. In some embodiments, control unit 105 may be located physically remote from any one or more of output device 110, input devices 115a and 115b, imaging device 125, illumination source 130, and stages 135a-135c. In the example illustrated, control unit 105 includes a communication unit 204, a power unit 206, a processor unit 208, a memory unit 210, an I/O unit 212, and a user interface engine 214.

Processor unit 208 controls the operation of control unit 105. Processor unit 208 can be any suitable processor, controller or digital signal processor that can provide sufficient processing power depending on the configuration, purposes and requirements of control unit 105 as is known by those skilled in the art. For example, processor unit 208 may be a high-performance general processor. In alternative embodiments, processor unit 208 can include more than one processor with each processor being configured to perform different dedicated tasks. In alternative embodiments, it may be possible to use specialized hardware to provide some of the functions provided by processor unit 208. For example, processor unit 208 may include a standard processor, such as an Intel® processor, or an AMD® processor.

Communication unit 204 can include wired or wireless connection capabilities. Communication unit 204 can be used by control unit 105 to communicate with other devices or computers. For example, control unit 105 may use communication unit 204 to communicate with one or more of output device 110, input devices 115a and 115b, imaging device 125, illumination source 130, stages 135a-135c and encoder 140. The communication may be conducted via a network, for example, any network or network components capable of carrying data including the Internet, Ethernet, fiber optics, mobile, wireless (e.g. Wi-Fi, WiMAX), local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

Processor unit 208 can also execute a user interface engine 214 that is used to generate various user interfaces. User interface engine 214 can be configured to provide user interfaces for displaying various menu options to a user, for example, menu options to define control sections for a CAD drawing or to define tolerances associated with the control sections. In some embodiments, user interface engine 214 can be configured to enable a user to manually align a CAD drawing and an image of a part, perform on-screen measurements based on the multiple images of the part and determine deviation of a part from its CAD drawing.

Power unit 206 can be any suitable power source that provides power to control unit 105 such as a power adaptor or a rechargeable battery pack depending on the implementation of control unit 105 as is known by those skilled in the art.

I/O unit 212 can include an interface to enable coupling of one or more of output device 110 and input devices 115a, 115b. I/O unit 212 can enable processor unit 208 to receive user inputs from input devices 115a, 115b. I/O unit 212 can also enable processor unit 208 to provide output displays to a user on output device 110.

Memory unit 210 comprises software code for implementing an operating system 220, programs 222, database 224, image processing engine 226, control section engine 228, comparison engine 230, and measurement engine 232.

Memory unit 210 can include RAM, ROM, one or more hard drives, one or more flash drives or some other suitable data storage elements such as disk drives, etc. Memory unit 210 is used to store an operating system 220 and programs 222 as is commonly known by those skilled in the art. For instance, operating system 220 provides various basic operational processes for control unit 105. For example, the operating system 220 may be an operating system such as Windows® Server operating system, or Red Hat® Enterprise Linux (RHEL) operating system, or another operating system.

Programs 222 include various programs so that control unit 105 can perform various functions such as, but not limited to, receive a CAD drawing and multiple images of the part, provide a display of the CAD drawing and the multiple images, perform an alignment of the CAD drawing with multiple images of the part and provide an indication of the deviation of the part from its CAD drawing. Programs 222 may also include an optical calibration program to determine the calibration for the distance between a pair of pixels in a received image and the physical distance between corresponding points on the part. In some embodiments, programs 222 may include an edge detection program to detect edges of a part in an image. Programs 222 may also include pattern matching programs that perform image analysis to find matching points on an image.

Database 224 may store data including the received CAD drawing and multiple images, imaging position data associated with the multiple images, any measurements of the part based on the received images and any indications of deviation of the part based on the alignment of the CAD drawing with the multiple images. The database 224 may run on control unit 105 as shown in FIG. 2, or may also run independently on a database server in network communication with the control unit 105.

Image processing engine 226 may perform real-time image correction operations on a stream of images received from imaging device 125. In some embodiments, the received images may be stored in database 224 and image processing engine 226 may perform image correction operations on images retrieved from database 224. Distortions in the images may be introduced by the optical lenses used in imaging device 125 or by defective pixels in optical sensors used in imaging device 125. The image correction operations may be carried out to obtain a geometrically correct image of the part, i.e., an image in which all the pixels correspond to the same real-world dimensions. Example image correction operations are described in further detail in U.S. Pat. No. 8,917,320.

Further, image processing engine 226 may perform image enhancement on the corrected images. Image processing engine 226 may perform real-time image enhancement operations on the stream of images received from imaging device 125 or the images retrieved from database 224. The image enhancement operations may include one or more of noise removal, uneven illumination correction, edge sharpening and color correction. Example image enhancement operations are described in further detail in U.S. Pat. No. 8,917,320.

Figure 3:
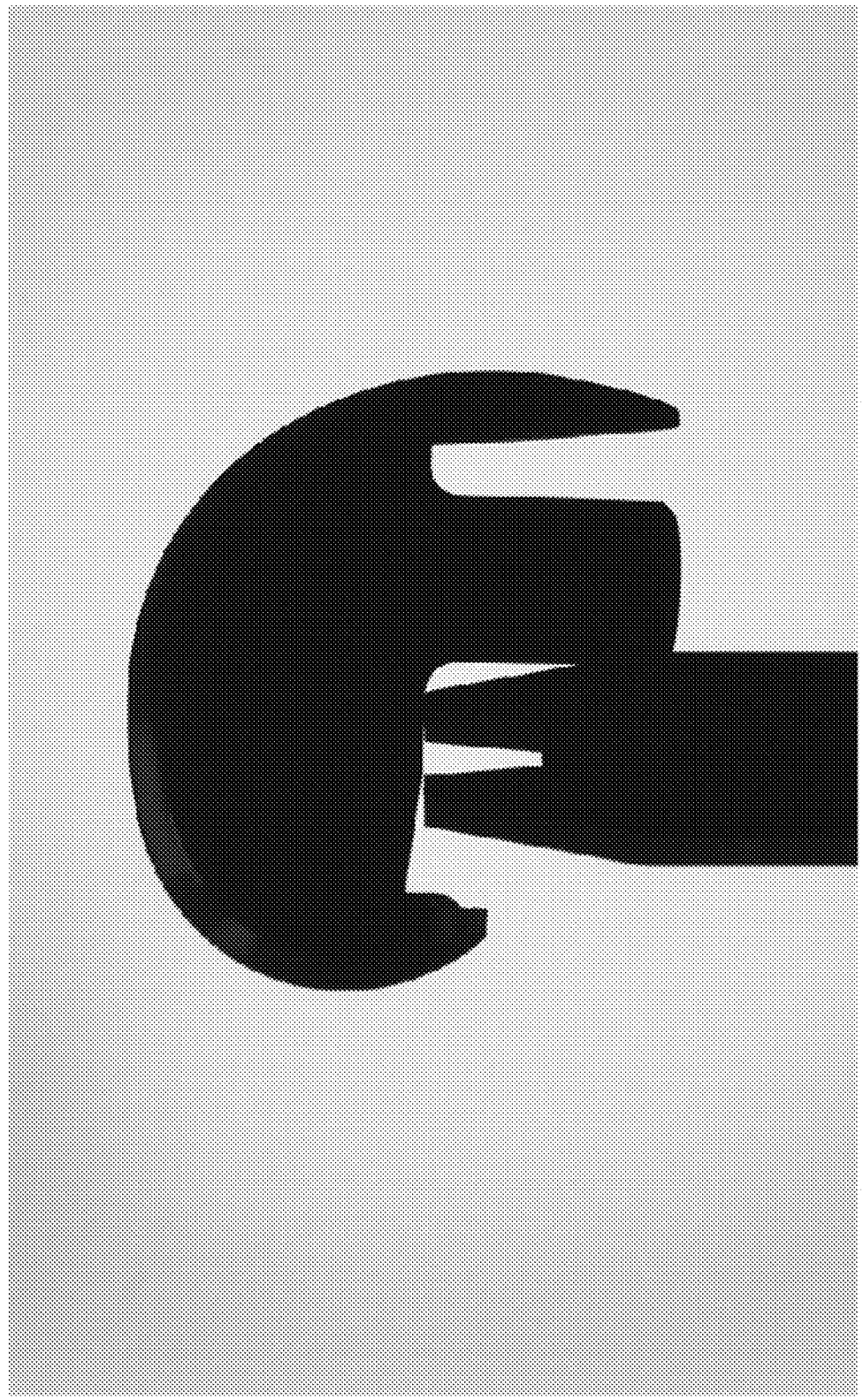
FIG. 3 shows an example of a corrected and enhanced image of a part.

Control unit 105 may use the corrected and enhanced images for performing alignment of a CAD drawing with the images. For example, FIG. 3 shows an example corrected and enhanced image 300 of a patellofemoral implant. In this example, the patellofemoral implant part fits within imaging device 125's optical field-of-view and a single image captures the entire part.

Control unit 105 may use one or more control sections associated with a CAD drawing to perform alignment of the CAD drawing with multiple images of the part. A control section may be a discrete point on the CAD data and may have an associated orientation and tolerance. In some embodiments, the control section may be normal to the CAD geometry at that location. The tolerance associated with the control section may be a bi-directional tolerance (e.g., +0.005"/−0.001"). The bi-directional tolerance may be a plus/plus tolerance (e.g., +0.005"/+0.001"), a minus/minus tolerance (e.g., −0.001"/−0.005") or zero-valued tolerance (e.g., +0.005"/0" or 0"/−0.005"). One or more control sections may be located on the CAD data. For example, a CAD drawing may include multiple control sections located at various single points along the CAD drawing that include features important for alignment of the CAD drawing with images of the part or for measuring deviation of the part from its CAD drawing. In some embodiments, the control sections may include multiple points along CAD entities that are spaced as a function of the resolution of the images received from imaging device 125. In some embodiments, the control sections may be located at a distance from the CAD entity and may not be located on the CAD entity itself.

Each of the multiple control sections may comprise different tolerances associated with it. Control sections may be user-defined or may be included in a CAD drawing used for manufacture of the part.

In some embodiments, control section engine 228 may enable a user to define one or more control sections for a CAD drawing. Example approaches to setting up control sections are described in further detail in U.S. Pat. No. 8,780,223. In some embodiments, control section engine 228 may automatically set up control sections using, for example, an adapted automatic discretization scheme.

Figure 4:
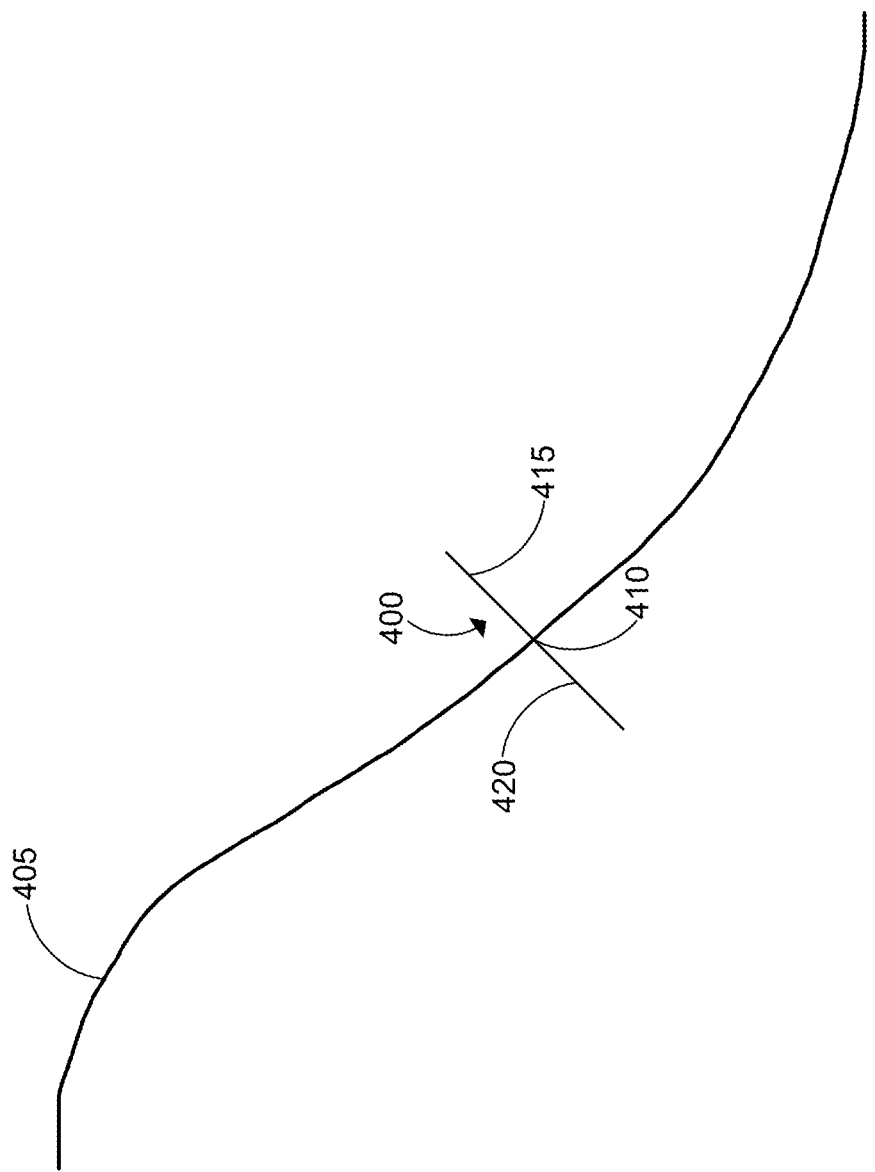
FIG. 4 shows a schematic representation of an example control section.

Referring now to FIG. 4, shown therein is a schematic representation of an example control section 400. Control section 400 is located on CAD data 405 at location 410. Control section includes a positive direction tolerance 415 and a negative direction tolerance 420.

Referring back now to FIG. 2, comparison engine 230 may perform alignment and comparison of a CAD drawing that includes one or more control sections with multiple images of the part. The CAD drawing may include geometric definition of an imaged part expressed in real-world units, e.g., in inches or millimeters. The CAD drawing may be included in a CAD file stored in database 224, for example, in DXF or DWG CAD file formats. Control unit 105 may read-in the CAD file of the imaged part and determine pixel representation of the CAD drawing using the optical calibration program included in programs 222. In some embodiments, control unit 105 may automatically scale the contents of the CAD drawing using an optical calibration program and provide a display of the scaled CAD drawing superimposed on an image or real-time stream of images of the part.

Figure 5A:
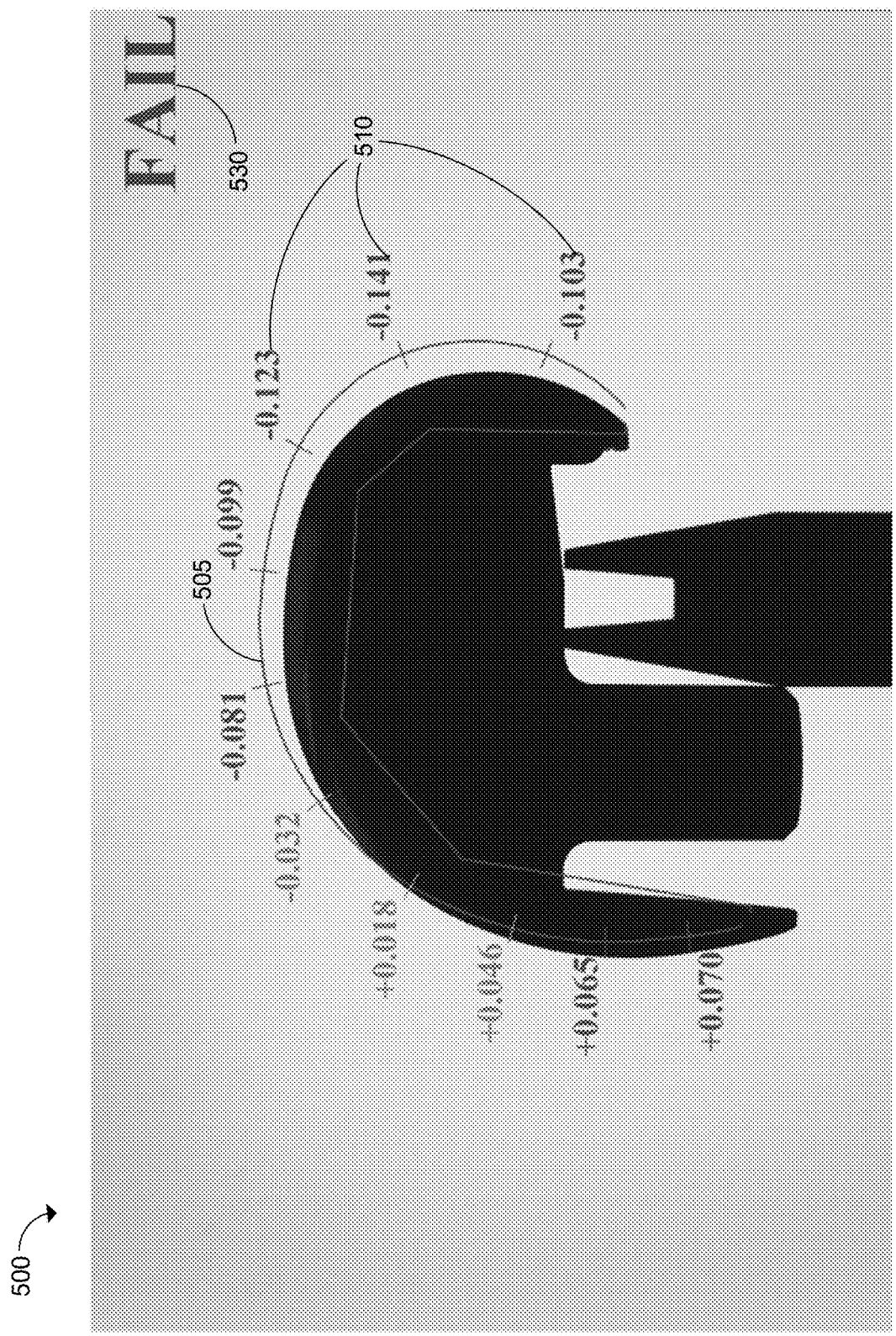
FIG. 5A shows an example of a CAD drawing superimposed on the corrected and enhanced image of the part shown in FIG. 3.

Comparison engine 230 may perform an alignment of the CAD drawing with an image of the part. For example, FIG. 5A shows an example 500 of a CAD drawing 505 superimposed on the corrected and enhanced image of the patellofemoral implant shown in FIG. 3. The alignment may be performed using a manual alignment process or an automated alignment process.

In the manual alignment process, a display showing the CAD drawing superimposed on the image of part may be provided to a user on output device 110. The user may provide alignment commands (e.g., x-y translation commands or rotation commands) using input devices 115a, 115b.

In the automated alignment process, comparison engine 230 may use a pattern matching program of programs 222 to locate matching pattern points between the CAD drawing and the image of the part and perform alignment based on the located matching pattern points. In some embodiments, a manual alignment process may be used the first time that a CAD drawing is aligned with an image (e.g., a first image) of the part. A result of the manual alignment (e.g., position and orientation of a CAD drawing with reference to the first image) may be stored in database 224. For subsequent comparisons of that CAD drawing with any new images of the part, comparison engine 230 may use the pattern matching program to determine a translation and/or rotation difference between the first image and the new image of the part. Comparison engine 230 may then perform automated alignment by applying the translation and/or rotation difference to the stored position and orientation of the CAD drawing. In some embodiments, comparison engine 230 may perform the automated alignment process without providing a display on output device 110.

Figure 6:
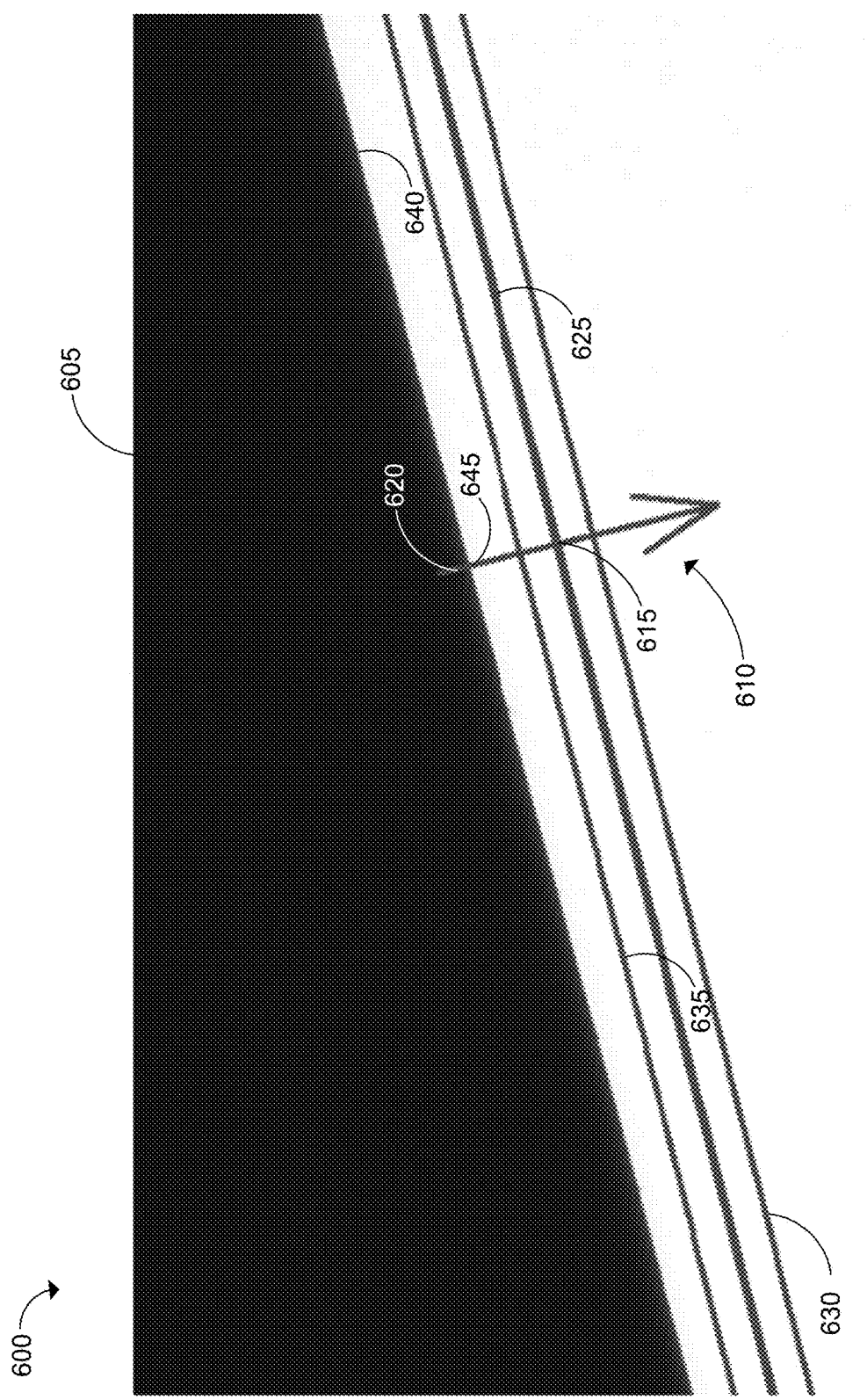
FIG. 6 shows a schematic representation of an example of a CAD drawing aligned with an image of a part.

Referring back now to FIG. 2, measurement engine 232 may perform measurements after a CAD drawing is aligned with an image of the part. Referring now to FIG. 6, shown therein is a schematic representation 600 of an example of a CAD drawing aligned with an image of a part 605. The CAD drawing may include a control section 610 at nominal location 615. Measurement engine 232 may determine a measurement point on an edge of part 605 corresponding to nominal location 615 of control section 610. The edge of part 605 may be automatically determined using an edge detection program included in programs 222.

In some embodiments, measurement engine 232 may determine the measurement point using a search range corresponding to the control section. The search range may be a line passing through the nominal location of the control section and normal to the CAD entity at the nominal location. The measurement point may be determined as the intersection of the search range with an edge of the part. For example, FIG. 6 shows a search range 620 corresponding to control section 610. Search range 620 passes through nominal location 615 and is normal to the CAD entity 625 at nominal location 615. Measurement engine 232 may determine measurement point 645 based on the intersection of search range 620 with edge 640 of part 605.

Measurement engine 232 can determine the measurement point along the length of the search range. The length of the search range may be based on the tolerance associated with the control section. For example, measurement engine 232 may set length of search range 620 as five times the distance between positive tolerance 630 and negative tolerance 635 shown in FIG. 6. In some embodiments, measurement engine 232 may set length of search range 620 based on user inputs received at input devices 115a or 115b.

Search range 620 may also have a positive and a negative direction associated with it. For the example shown in FIG. 6, positive direction of search range 620 is along a direction away from material of part 605. For examples where the search range intersects multiple edges of a part, the associated direction may be used to determine which of the multiple edges to locate the measurement point on.

Figure 7:
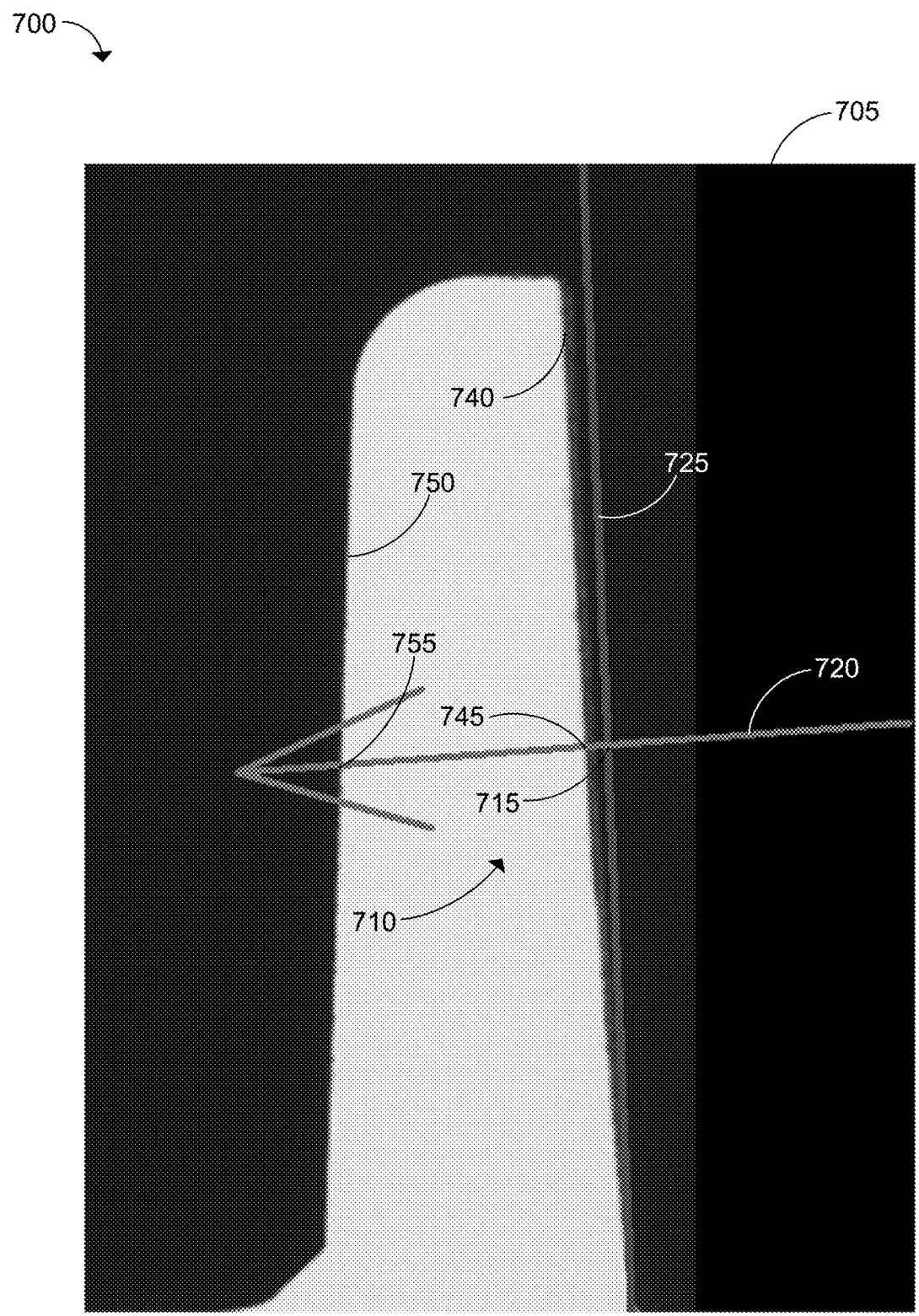
FIG. 7 shows a schematic representation of an example of a CAD drawing aligned with an image of a part.

Referring now to FIG. 7, shown therein is a schematic representation 700 of an example of a CAD drawing aligned with an image of a part 705. The CAD drawing may include a control section 710 at nominal location 715. Measurement engine 232 may determine a measurement point 745 on part 705 corresponding to nominal location 715 of control section 710. Measurement engine 232 may determine measurement point 745 using a search range 720 corresponding to control section 710. Search range 720 passes through nominal location 715 and is normal to the CAD entity 725 at nominal location 715. Search range 720 intersects edge 740 of part 705 at point 745 and intersects edge 750 at point 755. In this example, point 745 corresponds to search range direction away from material of part 705 (transition from black to white). In contrast, point 755 corresponds to search range direction towards material of part 705 (transition from white to black). Accordingly, between points 745 and 755, measurement engine 232 may determine point 745 as the measurement point.

In some embodiments, measurement engine 232 may use additional criteria to determine the measurement point using a search range. For example, measurement engine 232 may use an edge threshold to determine if a point along the search range is an edge point that must be considered in the determination of the measurement point. For example, the edge threshold may specify a specific change in black/white contrast level at a point to be considered as an edge point. In some examples, multiple points may be located using the search range (including the search range direction criteria) and measurement engine 232 may determine the measurement point as the point closest to the nominal location of the corresponding control section.

In some embodiments, measurement engine 232 may determine the measurement point using a pattern matching program of programs 222. For example, measurement engine 232 may define a search area centered on nominal location 615. Further, measurement engine 232 may use the pattern matching program to match patterns of part 605 in the search area to a pattern of the CAD drawing corresponding to control section 610. Measurement engine may determine the measurement point based on a best-match pattern located using the pattern matching program.

Figure 8:
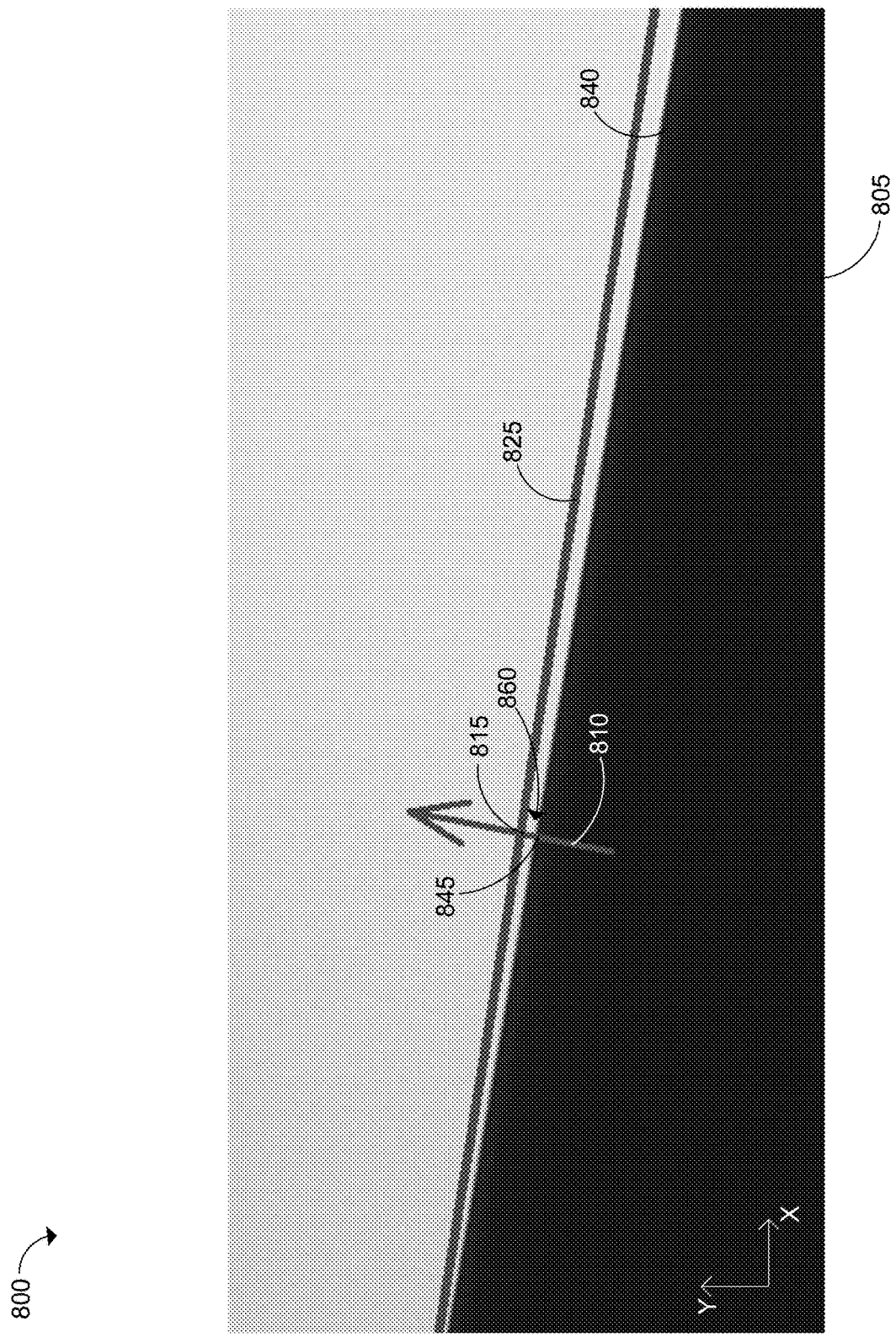
FIG. 8 shows a schematic representation of an example of a CAD drawing aligned with an image of a part.

Based on a determined measurement point, measurement engine 232 may determine a deviation of the part from its CAD drawing by measuring the distance between the measurement point and the nominal location corresponding to the control location. Referring now to FIG. 8, shown therein is a schematic representation 800 of an example of a CAD drawing aligned with an image of a part 805. The CAD drawing may include a control section 810 at nominal location 815 on CAD entity 825. Measurement engine 232 may determine a measurement point 845 corresponding to intersection of control section 810 with an edge 840 of part 805. Measurement engine 232 may determine measurement point 845 using a search range associated with the control section, as described above herein. Measurement engine 232 may further determine a deviation 860 of part 805 from its CAD drawing at control section 810. Measurement engine 232 may determine the corresponding physical deviation of the part from its geometric definition based on the calibration relationship between physical distance and the distance between a pair of pixels in the optical image.

In some embodiments, measurement engine 232 may indicate a deviation measured along the control section in a direction away from the material of the part as a positive deviation and a deviation measured in the opposite direction as a negative deviation. In the example of FIG. 8, measurement engine 232 may indicate deviation 860 as a negative deviation.

Figure 5B:
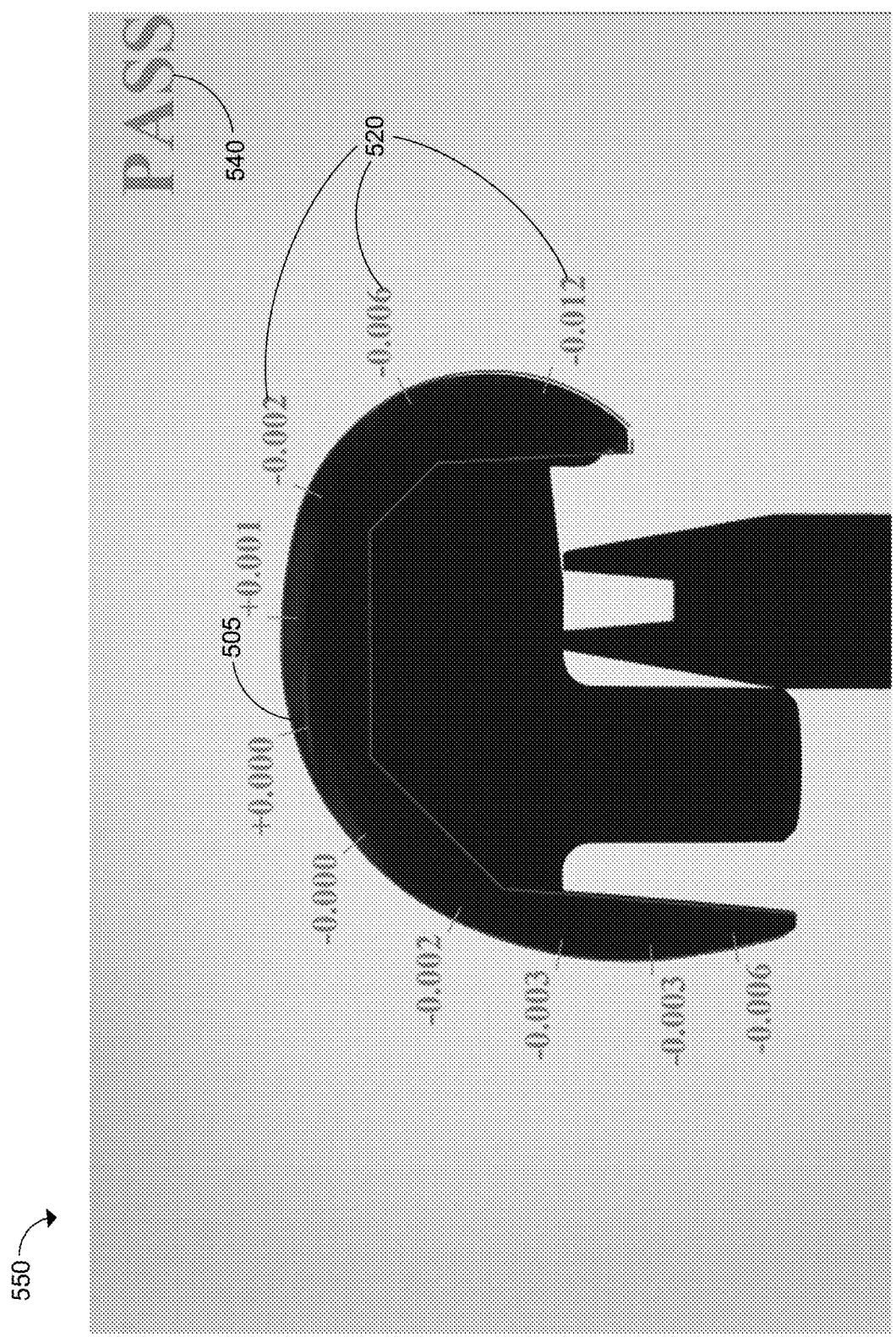
FIG. 5B shows an example of the CAD drawing of FIG. 5A after alignment.

In some embodiments, a CAD drawing may include multiple control sections and measurement engine 232 may determine a deviation for each control section. For example, as shown in FIGS. 5A and 5B, measurement engine 232 may determine deviations 510 and deviations 520 for multiple control sections located on CAD drawing 505.

Measurement engine 232 may determine a deviation pass/fail result for the part at a control section by comparing the measured deviation with the tolerance associated with the control section. For the example shown in FIG. 8, measurement engine 232 may determine the deviation pass/fail result at control section 810 based on a comparison of the negative deviation 860 with negative direction tolerance associated with control section 810. Measurement engine 232 may determine the deviation result as "pass" if the measured deviation is within the associated tolerance. In some embodiments, control unit 105 may provide a color-coded display on output device 110, for example, showing determined deviation "pass" result values in light grey and determined deviation "fail" result values in dark grey.

In some embodiments, a CAD drawing may include multiple control sections and measurement engine 232 may determine an overall deviation pass/fail result by combining determined deviation pass/fail results for each control section. For example, FIGS. 5A and 5B show determined overall deviation pass/fail results 530 and 540 respectively based on determined deviation pass/fail results for multiple control sections. Measurement engine 232 may determine the overall deviation pass/fail result as "pass" only if the determined deviation pass/fail result for each control section is "pass". Measurement engine 232 may determine the overall deviation pass/fail result as "fail" if the determined deviation pass/fail result for any control section is "fail". In some embodiments, measurement engine 232 may determine the overall deviation pass/fail result as "pass" if the determined deviation pass/fail result for at least a threshold percentage of control sections is "pass". Control unit 105 may provide a color-coded display of the overall deviation pass/fail result on output device 110, for example, showing an annotation of overall deviation "pass" result in light grey and showing an annotation of overall deviation "fail" result in dark grey.

The overall deviation pass/fail result and the determined deviation pass/fail results for each control section may depend on a number of factors including actual deviation of the part from its CAD drawing and alignment of the CAD drawing with the image of the part. For example, FIGS. 5A and 5B show examples of the same CAD drawing superimposed on the same image of a patellofemoral implant. In FIG. 5A, the CAD drawing is superimposed on the image and coarsely aligned resulting in determined deviation pass/fail results for multiple control sections (e.g., control sections 510) as "fail" and an overall deviation pass/fail result 530 as "fail". FIG. 5B shows the CAD drawing superimposed on the image after alignment (e.g., automated alignment by comparison engine 230) resulting in determined deviation pass/fail results for all the control sections (e.g., including control sections 520) as "pass" and an overall deviation pass/fail result 540 as "pass".

Figure 9A:
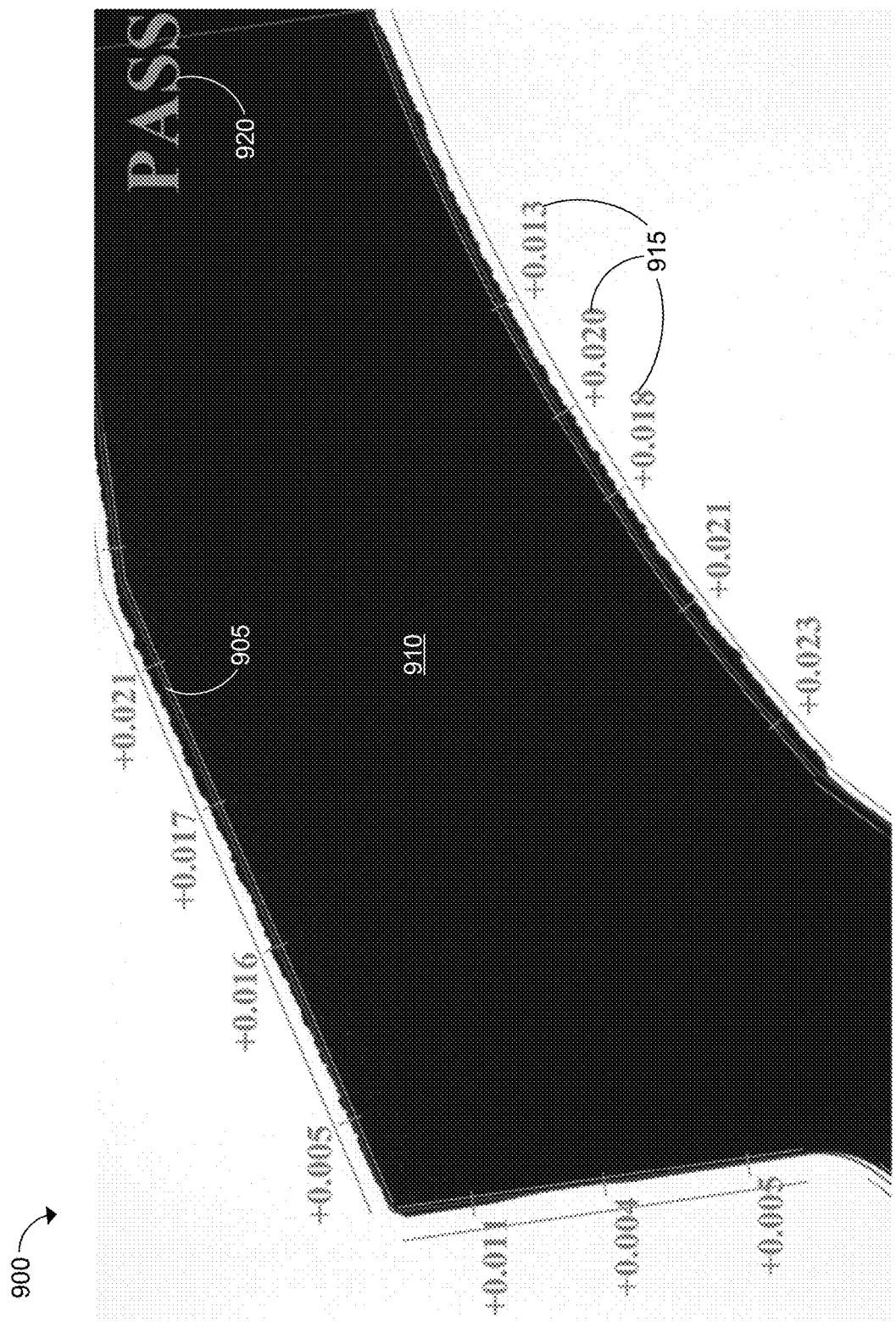
FIG. 9A shows an example of a portion of a CAD drawing superimposed on a corrected and enhanced image of a portion of a part.

Referring now to FIG. 9A, shown therein is an example 900 of a portion 905 of a CAD drawing superimposed on a corrected and enhanced image of a portion 910 of a hip implant. In contrast to the patellofemoral implant shown in FIGS. 3, 5A, and 5B, the hip implant may not fit within the field-of-view of imaging device 125. The image of the hip implant shown in FIG. 9A does not include the whole of the hip implant. Portion 905 of the CAD drawing may be aligned (e.g., automatically aligned by comparison engine 230) to portion 910 of the hip implant that is visible in the image. Measurement engine 232 may determine deviation pass/fail results (e.g., deviation pass/fail results 915) for each control section included in portion 905 of the CAD drawing. Measurement engine 232 may determine an overall deviation pass/fail result (e.g., an overall deviation result 920 of "pass") by combining the determined deviation pass/fail results for each control section.

Figure 9B:
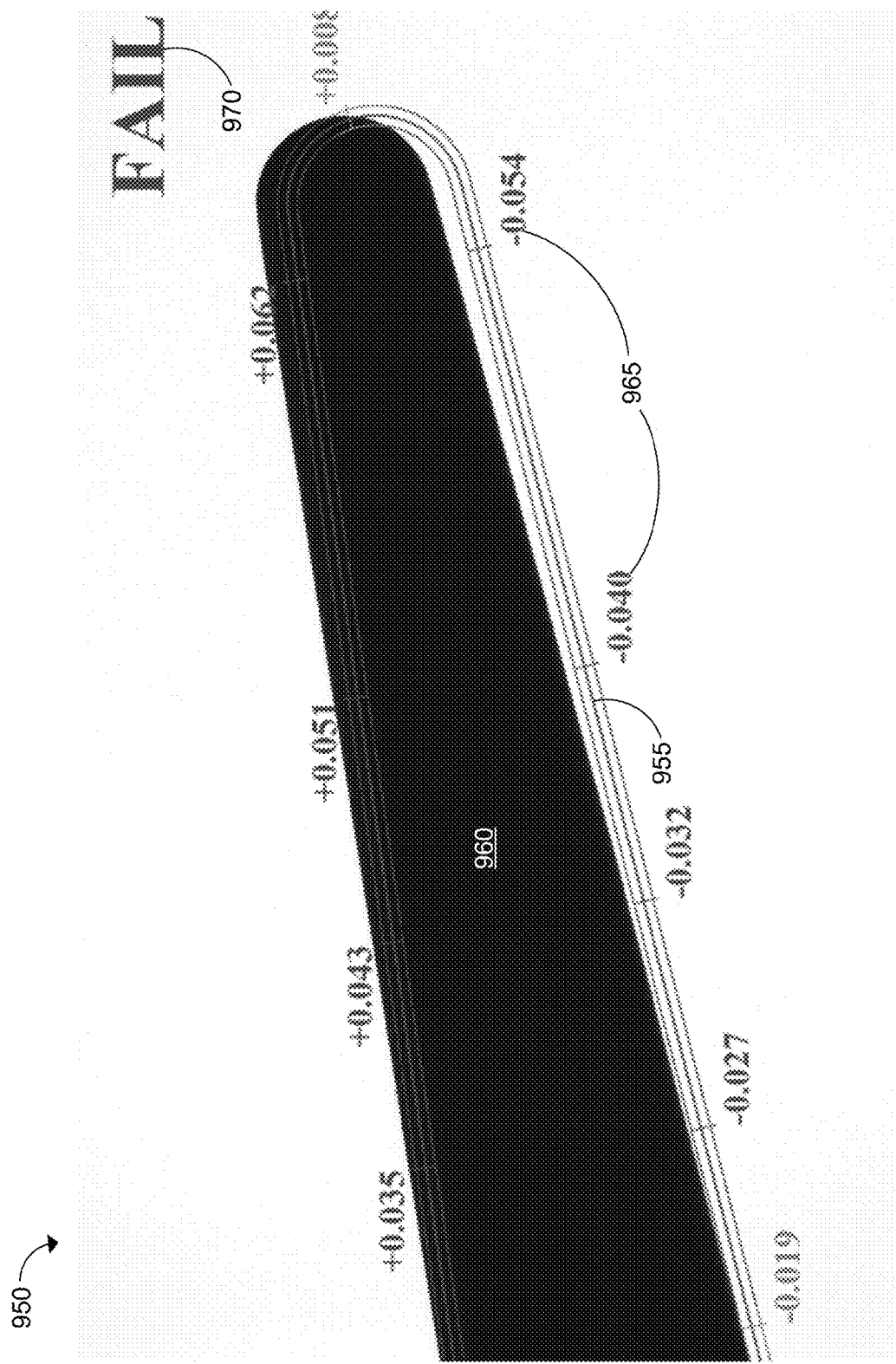
FIG. 9B shows an example of another portion of the CAD drawing shown in FIG. 9A superimposed on a corrected and enhanced image of another portion of the part shown in FIG. 9A.

Referring now to FIG. 9B, shown therein is an example 950 of another portion 955 of the CAD drawing shown in FIG. 9A superimposed on a corrected and enhanced image of another portion 960 of the hip implant shown in FIG. 9A.

For parts like the hip implant (that do not fit within the filed-of-view of the imaging device), if the alignment between the CAD drawing and the part is conducted using a single image, the alignment may deteriorate at portions of the CAD drawing and part that are distal from the portions used for alignment. For example, FIG. 9B shows a deteriorated alignment between portion 955 of the CAD drawing and portion 960 of the hip implant compared with the alignment between portions 905 and 910 shown in FIG. 9A. Therefore, when multiple images are required to capture all relevant features of a part and alignment is conducted using a single image, the alignment may be deteriorated for one or more of the other images.

The deteriorated alignment shown in FIG. 9B may cause erroneous overall deviation pass/fail results similar to the scenario described above herein with reference to FIG. 5A. For the example shown in FIG. 9B, measurement engine 232 may determine deviation pass/fail results 965 for multiple control sections as "fail" because of the deteriorated alignment. Further, measurement engine 232 may determine an overall deviation result 970 of "fail" because of the determined deviation results of "fail" for multiple control sections. The problem of erroneous overall deviation pass/fail results may be solved by first performing alignment using the multiple images and then determining the deviation pass/fail results using each of the multiple images.

Figure 10A:
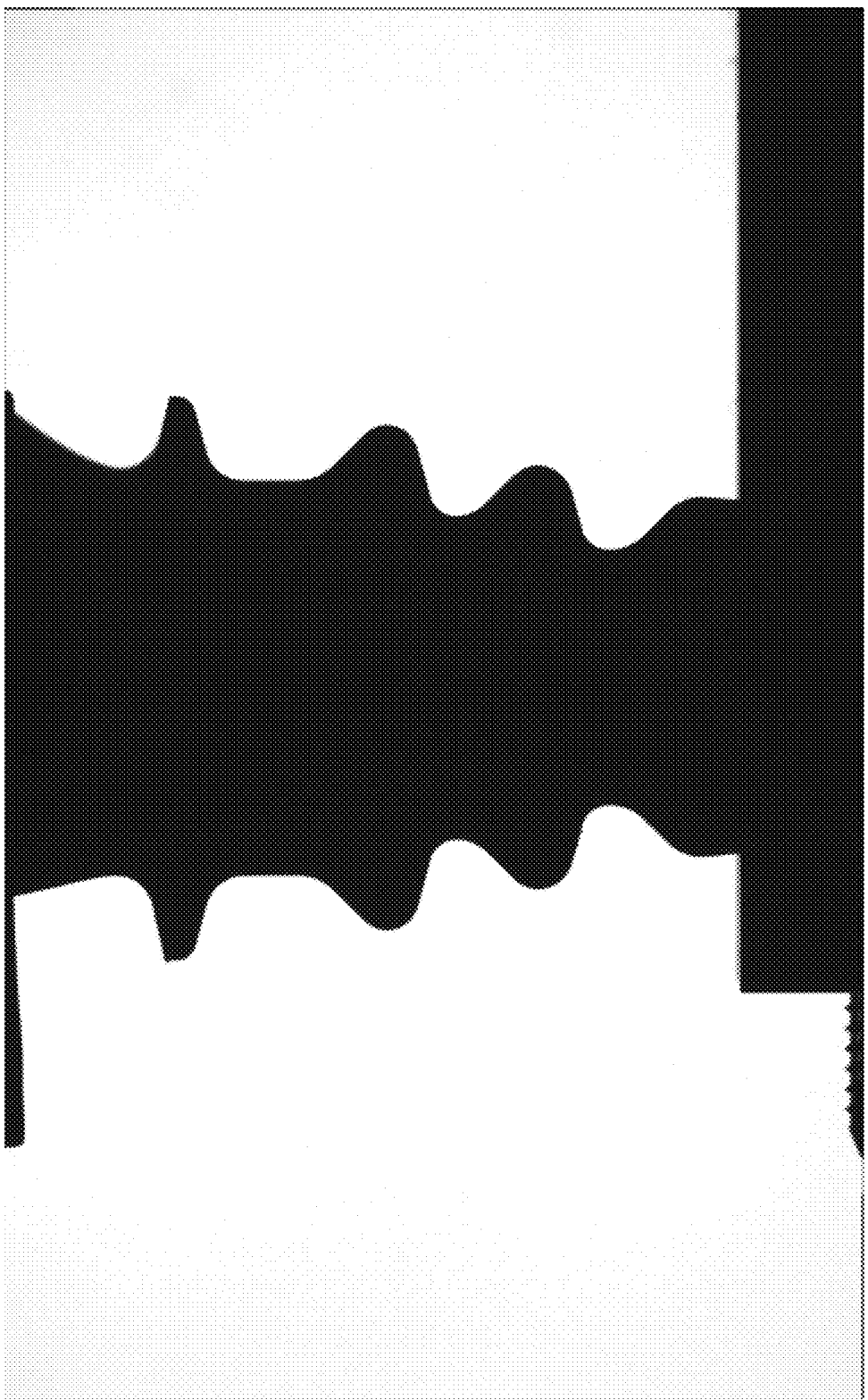
FIG. 10A shows an example image of a part at 10× magnification.
Figure 10B:
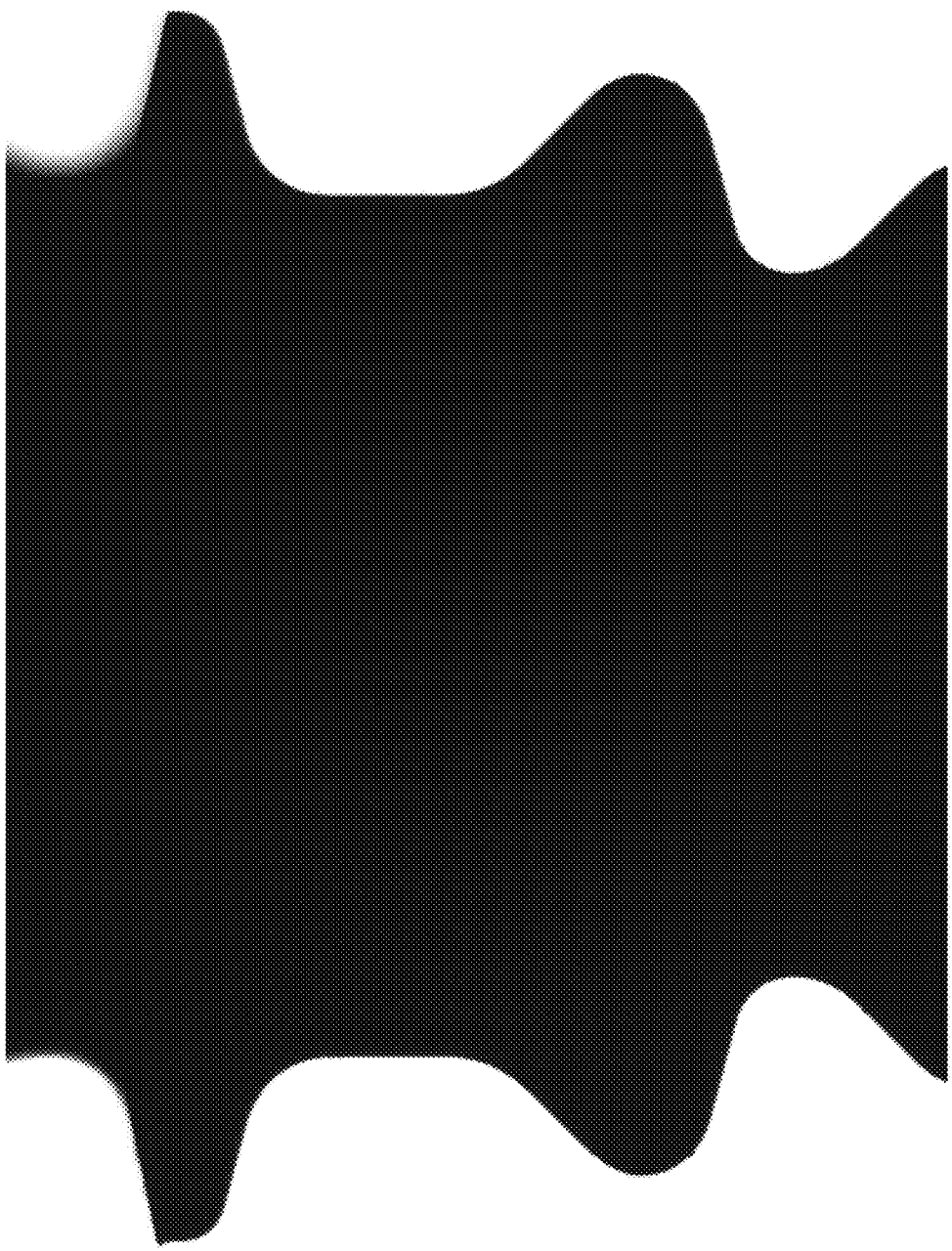
FIG. 10B shows an example image, at 20× magnification, of the part shown in FIG. 10A.
Figure 10C:
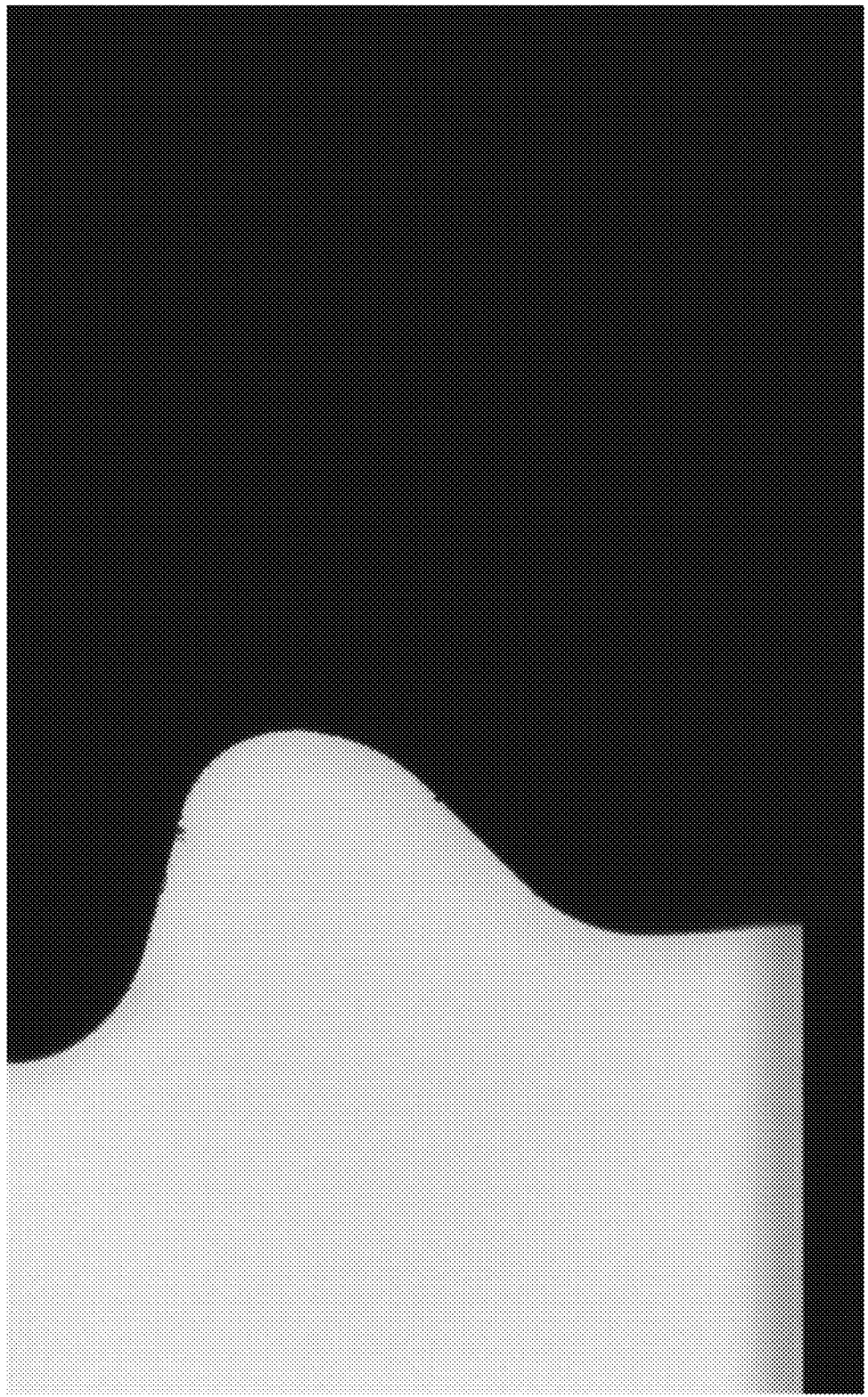
FIG. 10C shows an example image, at 50× magnification, of the part shown in FIGS. 10A and 10B.

Referring now to FIG. 10A, shown therein is an image 1010 of a turbine blade root form at 10× magnification. All features of interest in determining compliance of the turbine blade root form may fit within the imaging device's field-of-view. Accordingly, a CAD drawing of the turbine blade root form may be aligned with the single image at 10× magnification and compliance with the CAD drawing may be determined. However, the turbine blade root form may be required to be manufactured with high accuracy and higher optical magnification levels may be required to check compliance with tighter tolerance limits. FIG. 10B shows an image 1020 of the turbine blade root form at 20× magnification and FIG. 10C shows an image 1030 of the turbine blade root form at 50× magnification. At the higher magnifications, the field-of-view of the imaging device may be proportionally reduced, and multiple images may be required to capture all the features of interest. Like the scenario described herein above with reference to FIG. 9B, erroneous overall deviation pass/fail results may be determined if alignment is conducted using only a single image. The problem of erroneous overall deviation pass/fail results may be solved by first performing alignment using the multiple images and then determining the deviation pass/fail results using each of the multiple images.

Figure 11:
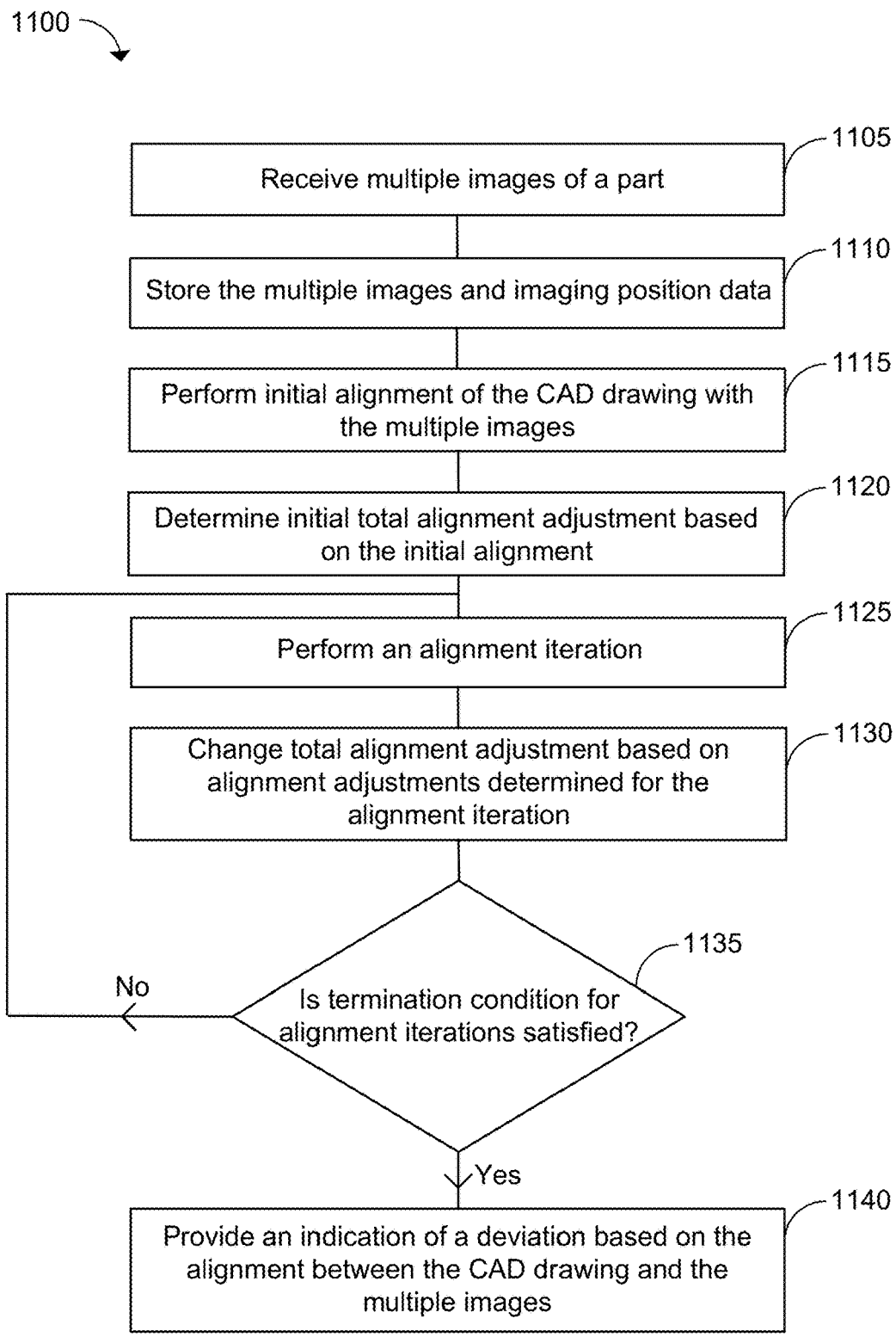
FIG. 11 is a flowchart illustrating an example method for alignment of a CAD drawing with multiple images of a part in accordance with this disclosure.

Referring now to FIG. 11, shown therein is a flowchart illustrating an example method 1100 for alignment of a CAD drawing with multiple images of a part in accordance with this disclosure. Method 1100 can be performed, for example, by control unit 105.

At 1105, multiple images of a part may be received. For example, control unit 105 may receive multiple images of part 120 from imaging device 125. Each of the multiple images may correspond to a portion of the part and a combination of the multiple images may provide a representation of the part as a whole. For example, the portions of the part may include portions 910 and 960 (shown in FIGS. 9A and 9B respectively) of a hip implant that is too large to fit into the field-of-view of the imaging device. The multiple images may be acquired by the imaging device at multiple imaging positions. In another example, a portion of the part may be the portion shown in FIG. 10B or 10C of a turbine blade root form at high magnification. Each image of the multiple images may include one or more features of interest for determining compliance of the part. A combination of the multiple images may include all features of interest required for determining compliance of the part.

The CAD drawing may include one or more control sections. The one or more control sections may comprise single points at multiple locations. An included control section, for example, can be control section 400. In some embodiments, the one or more control sections may comprise multiple points located along a CAD entity, wherein a spacing between the multiple points is based on the resolution of the multiple images. Each of the control sections may include a positive direction tolerance and a negative direction tolerance associated with the control section. Each of the received multiple images may include a portion of the part corresponding to at least one control section of the one or more control sections.

Image correction and image enhancement operations may be performed on the received images. For example, image processing engine 226 may perform real-time image correction and image enhancement operations on a stream of images received from imaging device 125.

At 1110, the multiple images and imaging position data associated with the multiple images may be stored. The imaging position data for each image may indicate relative position, during imaging, of the part with respect to the imaging device. For the example block diagram 100 shown in FIG. 1, control unit 105 may provide control commands to control motion of stage 135b that is used to mount part 120. The multiple images may be acquired by imaging device 125 at different x, y, and z positions of stage 135b. Encoder 140 may be used to measure the imaging position data indicating the relative position of part 120 with respect to imaging device 125 during imaging. Control unit 105 may receive the multiple images from imaging device 125 and the associated imaging position data from encoder 140. In some embodiments, control unit 105 may store the multiple images and the associated imaging position data in database 224.

At 1115, an initial alignment of the CAD drawing with the multiple images of the part may be performed. For example, comparison engine 230 may perform an initial alignment of a portion of the CAD drawing with an image representing a portion of the part. The initial alignment may be performed in real-time as the multiple images are received. In some embodiments, the initial alignment may be performed for a stored image retrieved from database 224. FIG. 5A shows an example 500 of a CAD drawing 505 superimposed on a corrected and enhanced image of a patellofemoral implant and initially aligned. The initial alignment may be performed using a manual alignment process or an automated alignment process. As described herein above, the manual alignment process may be based on user input received at input devices 115a, 115b and the automated alignment process may be automatically performed using pattern matching.

At 1120, an initial total alignment adjustment may be determined based on the initial alignment. For example, control unit 105 may determine a translation adjustment and/or a rotation adjustment for the CAD drawing corresponding to the initial alignment between the CAD drawing and the image of the part. The translation adjustment may include, for example, an x-axis adjustment and/or a y-axis adjustment, and the rotation adjustment may include a rotational angle adjustment in the x-y plane. In some embodiments, for example where the multiple images include images acquired at different z-axis or depth positions, the translation adjustment may also include a z-axis adjustment and the rotation adjustment may include rotational angle adjustments in the y-z and/or x-z planes.

Figure 12:
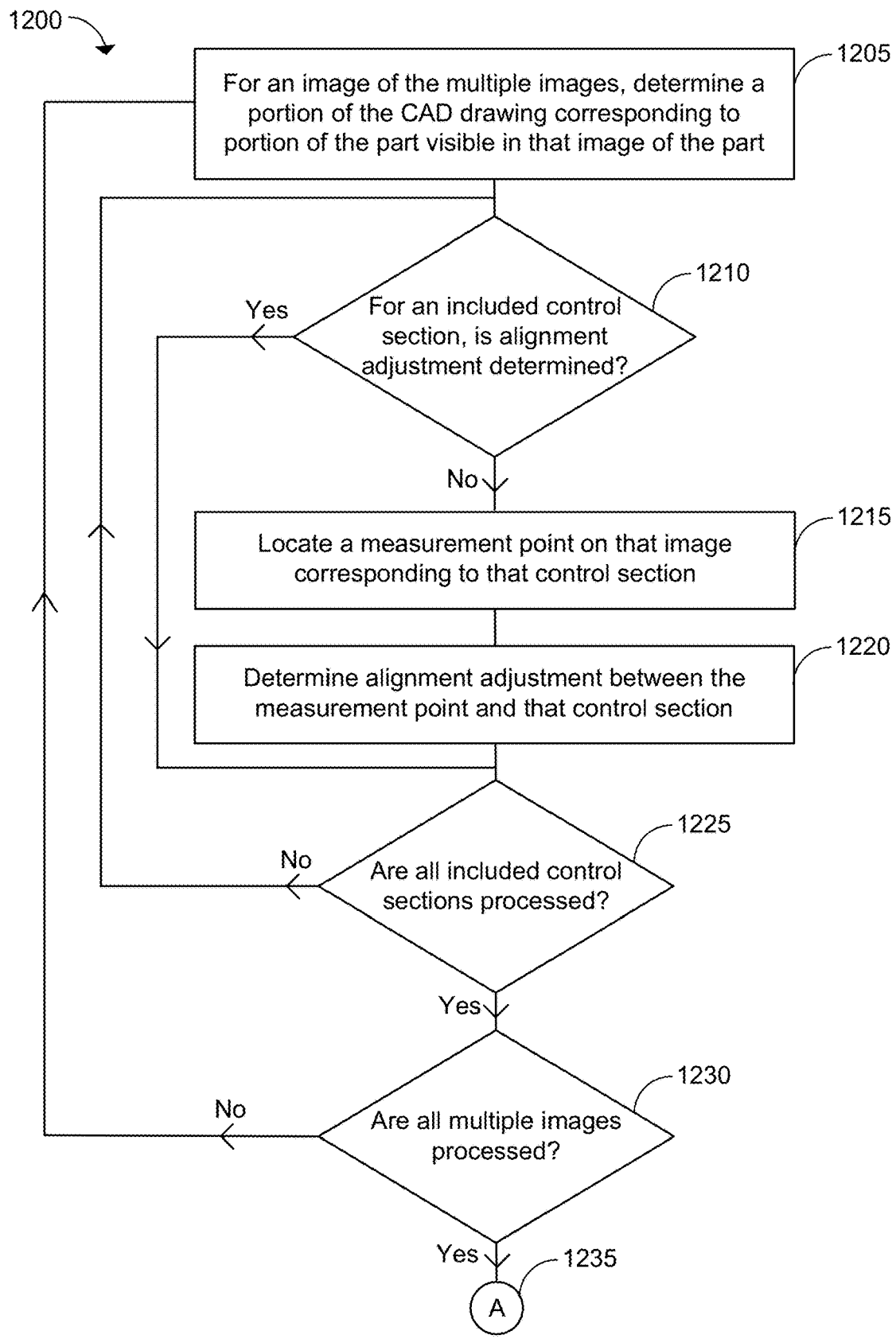
FIG. 12 is a flowchart illustrating an example method for performing an alignment iteration in accordance with this disclosure.

At 1125, an alignment iteration may be performed. For example, control unit 105 may perform the alignment iteration. Referring now to FIG. 12, shown therein is a flowchart illustrating an example method 1200 for performing an alignment iteration in accordance with this disclosure. Control unit 105 may, for example, perform method 1200 in conjunction with method 1100 at 1125.

At 1205, for an image of the multiple images, a portion of the CAD drawing may be determined corresponding to portion of the part visible in that image. The corresponding portion of the CAD drawing may be determined based on the imaging position data associated with the image. For example, control unit 105 may determine a difference in imaging position data between the current image and the image used for initial alignment at 1120. Control unit 105 may then use the initial alignment and the determined difference to determine the corresponding portion of the CAD drawing.

At 1210, it may be determined if an alignment adjustment has already been determined, during current alignment iteration, for a control section included in the portion of the CAD drawing (determined at 12005). For example, control unit 105 may determine if an alignment adjustment has already been determined, during the current alignment iteration, for the control section. If an alignment adjustment has not already been determined, method 1200 may proceed to 1215. If an alignment adjustment has already been determined, method 1200 may proceed directly to 12025.

In some embodiments, if an alignment adjustment has already been determined and a skip parameter is set, method 1200 may proceed to 1215. The skip parameter may be based on user input received at input devices 115a and 115b. In some embodiments, the skip parameter may be a value stored in database 224. For examples where the alignment adjustment has already been determined and the skip parameter is set, method 1200 may further comprise performing weighting of an alignment adjustment determined at 1220 with previous alignment adjustments determined for that control section during the current alignment iteration. For example, a specific control section may be included for three of the multiple images. If the skip parameter is set, three alignment adjustments (corresponding to the three images of an alignment iteration) may be determined for the specific control section and a weighting factor of ⅓ may be applied to each of the three alignment adjustments. The weighting factors may not always be equal. Different weighting factors may be used depending on the control section and the image that the control section is included in.

At 1215, a measurement point corresponding to the control location may be located on the image of the part. The measurement point may be located using pattern matching or a search range corresponding to the control location. For example, control unit 105 may determine the measurement point using a search range as described herein above in reference to FIGS. 6-7. As shown in FIG. 6, measurement engine 232 of control unit 105 may determine measurement point 645 based on intersection of search range 620 with edge 640 of part 605. If a measurement point is located, method 1200 may proceed to 1220.

However, if the initial alignment of the CAD drawing with the multiple images of the part is not appropriate, a measurement point may not be located within the search range corresponding to the control section. For example, the misalignment between a CAD drawing and a part after initial alignment at 1115 of method 1100 may be larger than the search range corresponding to a control section. Therefore, the search range may not intersect any edge of the part and a measurement point corresponding to the control section may not be determined using the search range. In this example, using a longer search range may help overcome the problem. However, in some cases, a longer search range may intersect multiple edges of the part thereby increasing complexity of method 1200 and potentially leading to erroneous determination of the measurement point. Using shorter search ranges may reduce the probability of intersection with multiple edges of the part. However, using shorter search ranges may require better initial alignment at 1115 of method 1100.

Figure 13:
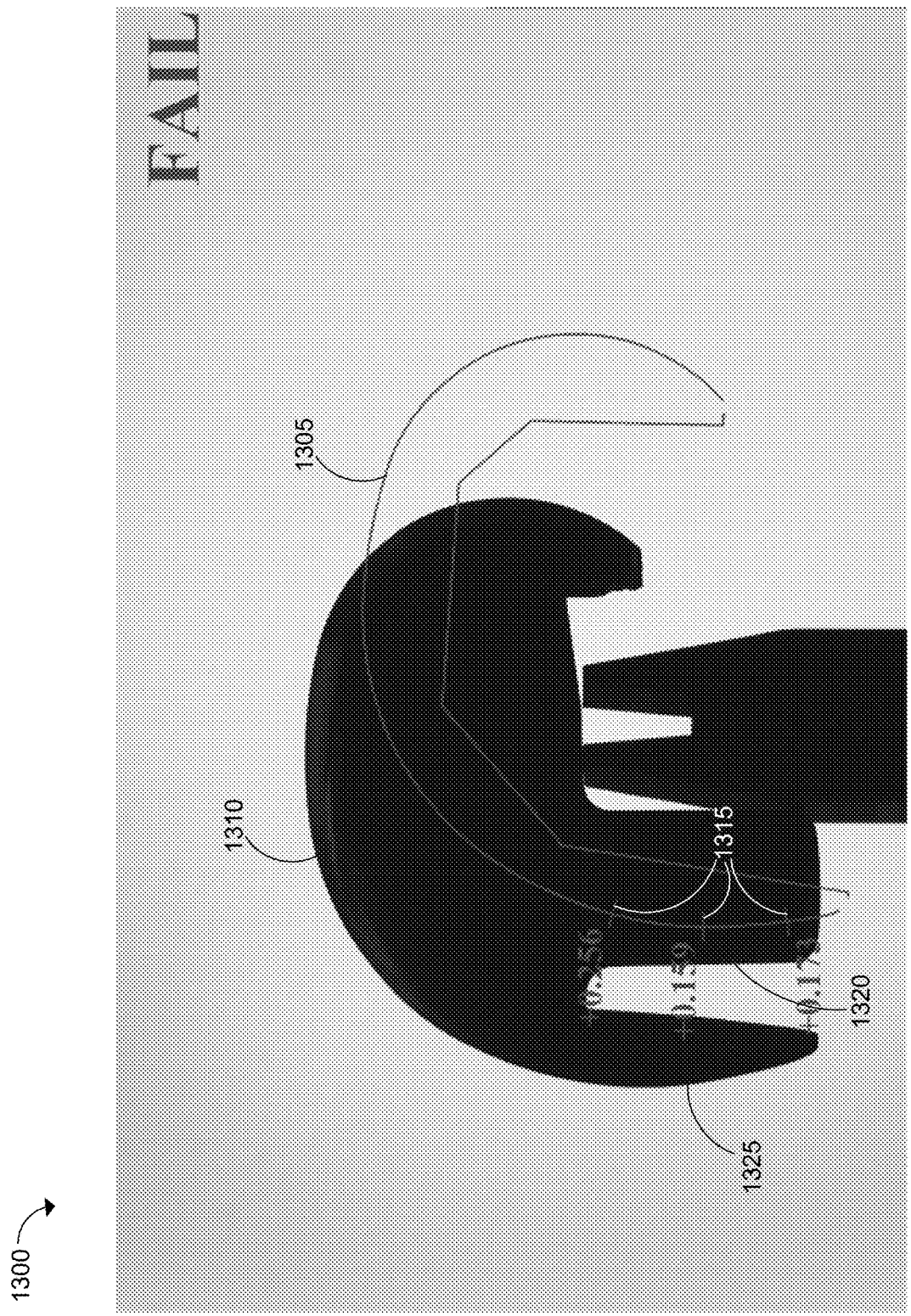
FIG. 13 shows an example of a CAD drawing superimposed on an image of a part.

Referring now to FIG. 13, shown therein is an example 1300 of a CAD drawing 1305 superimposed on an image of a part 1310. In example 1300, the initial alignment between CAD drawing 1305 and part 1310 may be such that search ranges 1315 are closer to edge 1320 of part 1310 compared with edge 1325 of part 1310. Therefore, an incorrect measurement point may be located on edge 1320 instead of a correct measurement point located on edge 1325. In this example, a potential solution may be additional control sections corresponding to the top edge of part 1310. This may enable a better initial alignment of the CAD drawing and the part. Another potential solution may be the use of pattern matching program of programs 222, as described herein above, to perform the initial alignment of the CAD drawing and the part.

Figure 14:
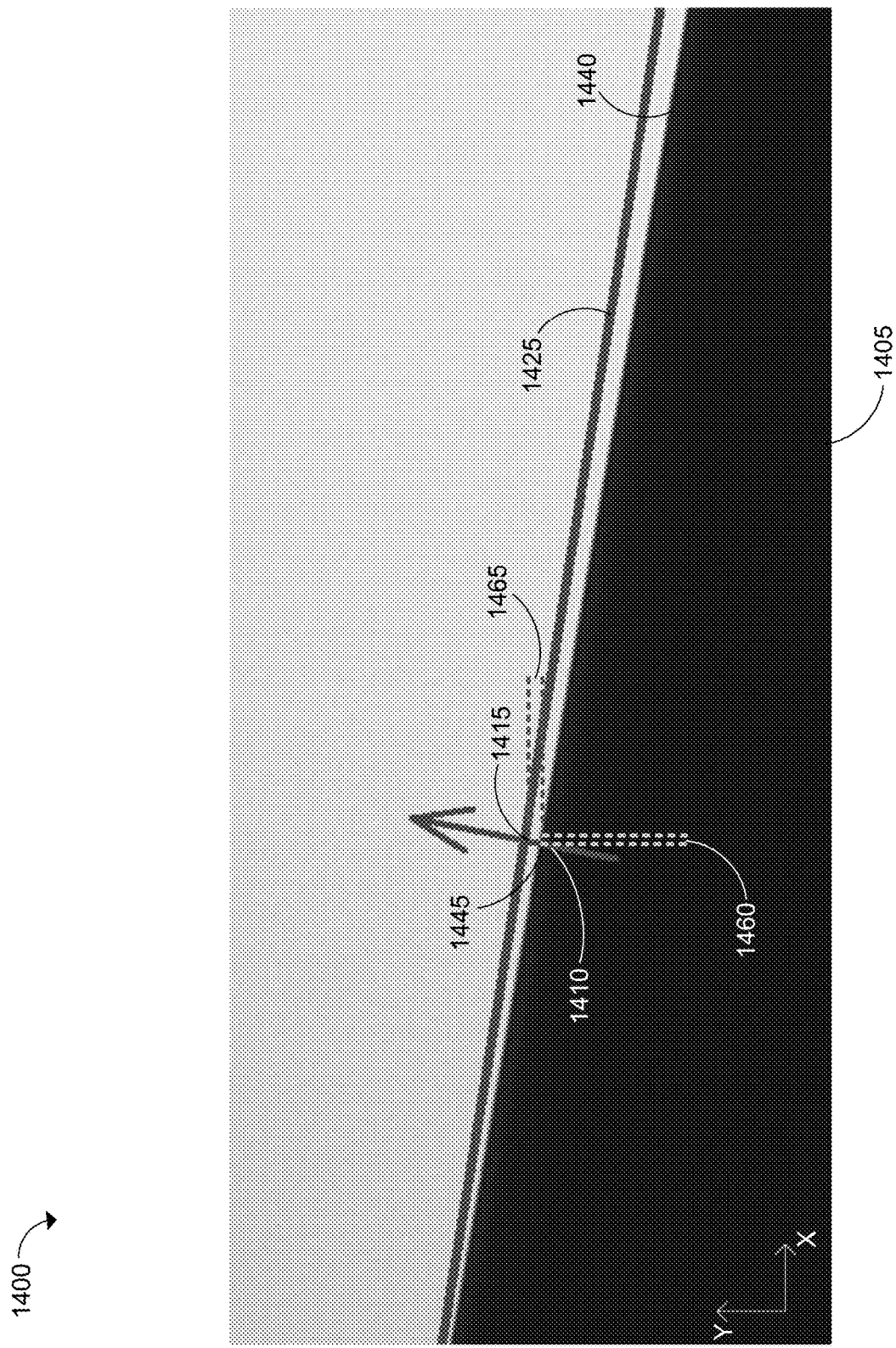
FIG. 14 shows a schematic representation of an example of a CAD drawing aligned with an image of a part.

Referring back now to FIG. 12, at 1220, an alignment adjustment between the measurement point (located at 1215 of method 1200) and the control section may be determined. For example, control unit 105 may determine the alignment adjustment between the measurement point and the control section. Referring now to FIG. 14, shown therein is a schematic representation 1400 of an example of a CAD drawing aligned with an image of a part 1405. The CAD drawing may include a control section 1410 at nominal location 1415 on CAD entity 1425. Schematic representation 1400 includes measurement point 1445 corresponding to intersection of search range for control section 1410 with an edge 1440 of part 1405. The alignment adjustment between the measurement point and the control section may comprise a translation adjustment and/or a rotation adjustment.

The alignment adjustment may be determined based on a deviation-from-nominal method. For example, measurement engine 232 may determine a translation adjustment comprising an x-axis alignment adjustment 1460 and a y-axis alignment adjustment 1465 based on the difference between measurement point 1445 and nominal location 1415. Measurement engine 232 may also determine the corresponding physical x-axis and y-axis alignment adjustments based on the calibration relationship between physical distance and the distance between a pair of pixels in the optical image. Furthermore, measurement engine 232 may determine a rotation alignment adjustment.

Figure 15:
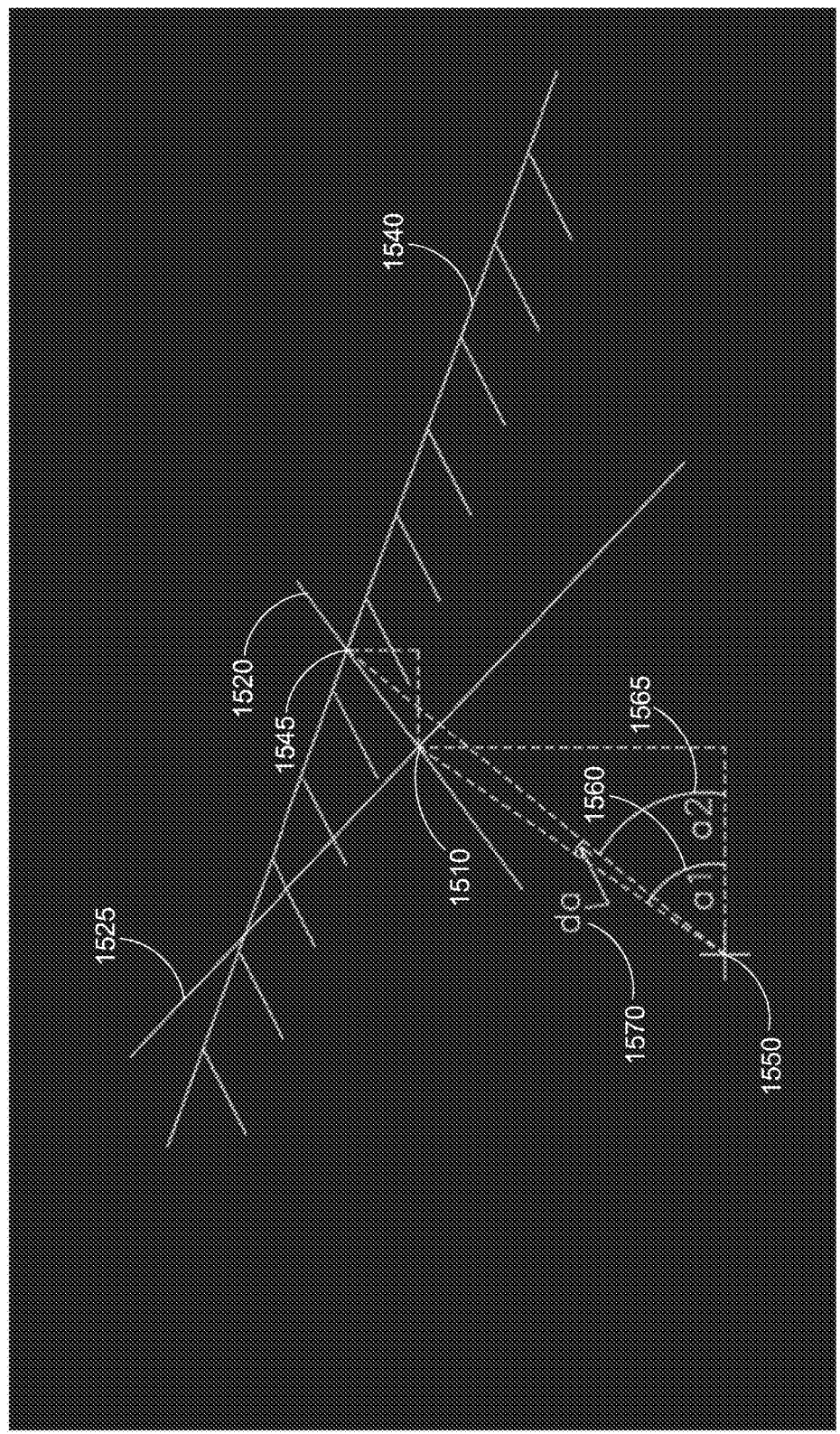
FIG. 15 shows a schematic representation of an example of a CAD drawing aligned with an image of a part.

Referring now to FIG. 15, shown therein is a schematic representation 1500 of an example of a CAD drawing aligned with an image of a part. The CAD drawing may include a control section 1510 on CAD entity 1525. Schematic representation 1500 includes measurement point 1545 corresponding to intersection of search range 1520 with an edge 1540 of the part. Schematic representation 1500 also includes a center of rotation 1550 used in determining the rotation alignment adjustment. Center of rotation 1550 may be set based on user input received at input devices 115*a* and 115*b*. In some embodiments, center of rotation 1550 may be determined automatically, for example, as a centroid of all control sections included in the determined portion of the CAD drawing. As shown in FIG. 15, measurement engine 232 may determine rotation alignment adjustment 1570 based on the angles 1560 and 1565 corresponding to control section 1510 and measurement point 1545 respectively.

In some embodiments, a multiplier may be applied to the determined rotation alignment adjustment to speed up rotation convergence and reduce the number of alignment iterations needed before a termination condition is satisfied. For example, a multiplier of 1.1 may be applied to the determined rotation alignment adjustment. However, a large value of the multiplier may cause divergence and suboptimal alignment. In some embodiments, control unit 105 may include a maximum value of the multiplier stored in database 224. For example, the maximum value of the multiplier may be 1.2.

In some cases, the deviation-from-nominal method may produce alignment results where the CAD drawing is very closely aligned with the part in almost all portions of the CAD drawing but slightly out-of-tolerance in one small portion. A user may want to adjust the alignment to bring all portions of the CAD drawing into tolerance even if it slightly deteriorates the alignment (while still staying within tolerance) in other portions. The described embodiments may enable such alignment adjustments by determining the alignment adjustment using methods other than a deviation-from-nominal method.

For example, the alignment adjustment may be determined using a fit-to-tolerance method. Referring back now to FIG. 6, schematic representation 600 shows an example of a CAD drawing aligned with an image of a part 605. Schematic representation 600 shows control section 610 located at nominal location 615 and measurement point 645 located on edge 640 of part 605. Schematic representation 600 also shows positive tolerance 630 and negative tolerance 635 associated with control section 610. As shown in FIG. 6, measurement point 645 may be out of tolerance limits associated with control section 610. Measurement engine 232 may determine one or more alignment adjustments to reduce the distance between measurement point 645 and negative tolerance 635.

In some embodiments, the alignment adjustment may be determined using a combination of methods. For example, measurement engine 232 may use a deviation-from-nominal method for initial alignment iterations and then switch to use a fit-to-tolerance method based on a switching condition. The switching condition may be a number of alignment iterations or a threshold value for the alignment adjustment.

Referring back now to FIG. 12, at 1225, it may be determined whether all control sections included in the portion of the CAD drawing have been processed during current alignment iteration. If all control sections have been processed, method 1200 may proceed to 1230. If there are any remaining control sections, method 1200 may proceed to 1210 and determine if an alignment adjustment has already been determined, during current alignment iteration, for the next control section.

At 1230, it may be determined whether all the images included in the multiple images have been processed during current alignment iteration. If there are any remaining images, method 1200 may proceed to 1205 and determine a portion of the CAD drawing corresponding to portion of the part visible in the next image. If all images have been processed, method 1200 may proceed to 1235. At 1235, method 1200 may proceed, for example, to 1130 of method 1100.

Referring back now to FIG. 11, at 1130, the total alignment adjustment may be changed based on alignment adjustments determined for the alignment iteration. For example, control unit 105 may change the total alignment adjustment between the CAD drawing and the part by combining the alignment adjustments determined using method 1200 for each control section included in the multiple images. This may improve the alignment between the CAD drawing and the images of the part before the next alignment iteration is performed. The total alignment adjustment may be changed based on a total translation adjustment and/or a total rotation adjustment. For example, control unit 105 may determine an x-axis total translation adjustment by adding the x-axis alignment adjustment 1460 for each control section included in the multiple images. Control unit 105 may determine a y-axis total translation adjustment by adding the y-axis alignment adjustment 1465 for each control section included in the multiple images. Control unit 105 may determine a total rotation adjustment by adding the rotation alignment adjustment 1570 for each control section included in the multiple images.

In embodiments that include one or more images corresponding to multiple z-axis imaging positions, control unit 105 may perform methods 1100 and 1200 described herein above to further include translation alignment adjustments along the z-axis and rotation alignment adjustments in the y-z and/or x-z planes.

At 1135, it may be determined whether a termination condition for alignment iterations is satisfied. The termination condition may include a minimum total alignment adjustment threshold. For example, control unit 1135 may determine that the termination condition is satisfied when one or both of the total translation adjustment and the total rotation adjustment determined for an alignment iteration are below corresponding threshold values. The termination condition may be based on separate total translation adjustment threshold values in the x, y and/or z axis directions.

In some embodiments, the termination condition may include a maximum iteration threshold. For example, if an initial alignment between the CAD drawing and the part is inappropriate, then the termination condition for minimum total alignment adjustment threshold may not be satisfied even after a large number of iterations. In such cases, a termination condition that includes a maximum number of iterations can conserve computing resources by terminating the alignment iterations.

At 1140, an indication of a deviation of the part from its CAD drawing may be provided to a user on output device 110. The indication may be based on the alignment between the CAD drawing and the multiple images. For example, after applying the final value of the total alignment adjustment to the CAD drawing, control unit 105 may determine the deviation of the part from its CAD drawing at each control section included in the multiple images. As explained herein above with reference to FIG. 8, measurement engine 232 may determine a deviation 860 of part 805 from its CAD drawing at control section 810. Control unit 105 may determine the deviation using the same control sections and multiple images that were used for alignment using method 1100. No new images are required to determine the deviation. This can improve speed and efficiency of the described embodiments. Control unit 105 may verify, for each control section of the multiple images, if the part is within tolerance bands associated with that control section and provide an indication on output device 110, for example. The indication may include an overall deviation pass/fail result, for example, overall deviation pass result 540 as described herein above with reference to FIG. 5B.

The embodiments described herein above provide examples of aligning a CAD drawing with one or more images of a part. A person skilled in the art will recognize that in some embodiments, the alignment may be performed by aligning one or more images of the part with the CAD drawing. In some embodiments, an alignment between a CAD drawing and images of a part may be performed by controlling relative motion between the part and imaging device used to acquire the images. The controlled relative motion may be provided, for example, using stage 135b and/or stage 135c shown herein above in FIG. 1.

As will be apparent to a person of skill in the art, certain adaptations and modifications of the described methods can be made, and the above discussed embodiments for alignment of multiple images of a part with a CAD drawing should be considered to be illustrative and not restrictive.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

I claim:

1. A system for alignment and comparison of a CAD drawing that includes one or more control sections with multiple images of a part, wherein each of the multiple images corresponds to a portion of the part and a combination of the multiple images provides a representation of the part as a whole, the system comprising:
    an imaging device for acquiring the multiple images, wherein each of the multiple images corresponds to at least one control section of the one or more control sections;
    a memory module for storing the multiple images and imaging position data associated with the multiple images, wherein the imaging position data for each image indicates relative position, during imaging, of the part with respect to the imaging device;
    a processing module configured to perform an initial alignment of the CAD drawing with the multiple images of the part, determine an initial total alignment adjustment based on the initial alignment and perform one or more alignment iterations until a termination condition is satisfied, wherein each alignment iteration comprises:
        for each of the multiple images of the part:
            determine a portion of the CAD drawing corresponding to portion of the part visible in that image of the part, and for each control section included in the portion of the CAD drawing:
                if an alignment adjustment corresponding to that control section has not been determined during that alignment iteration, locate a measurement point on that image of the part corresponding to that control section; and
                determine the alignment adjustment between the measurement point and that control section;
        change the total alignment adjustment based on the determined alignment adjustments for that alignment iteration; and
        determine if the termination condition is satisfied; and
    an output device for providing a user with an indication of a deviation, based on the alignment between the CAD drawing and the multiple images.

2. The system of claim 1, wherein the one or more control sections comprise single points at multiple locations.

3. The system of claim 1, wherein the one or more control sections comprise multiple points located along a CAD entity, wherein a spacing between the multiple points is based on a resolution of the multiple images.

4. The system of claim 1, wherein the initial alignment is based on user input received at an input device.

5. The system of claim 1, wherein the initial alignment is automatically performed using pattern matching.

6. The system of claim 1, wherein the measurement point is located using pattern matching.

7. The system of claim 1, wherein the measurement point is located using a search range corresponding to that control section.

8. The system of claim 1, wherein, if the alignment adjustment corresponding to that control section has been determined during that alignment iteration and a skip parameter is set, the processing module is further configured to perform weighting of the multiple alignment adjustments corresponding to that control section.

9. The system of claim 1, wherein the alignment adjustment between the measurement point and that control section is determined based on a deviation-from-nominal method.

10. The system of claim 1, wherein the alignment adjustment between the measurement point and that control section is determined based on a fit-to-tolerance method.

11. The system of claim 1, wherein the total alignment adjustment includes a translation adjustment and/or a rotation adjustment.

12. The system of claim 1, wherein the alignment iteration termination condition includes a maximum iteration threshold and a minimum total alignment adjustment threshold.

13. The system of claim 1, wherein providing the user with the indication of the deviation, based on the alignment, includes verifying, for each control section, if the part is within tolerance bands associated with that control section.

14. A method for alignment and comparison of a CAD drawing that includes one or more control sections with multiple images of a part, wherein each of the multiple images corresponds to a portion of the part and a combination of the multiple images provides a representation of the part as a whole, the method comprising:
    receiving the multiple images, wherein each of the multiple images corresponds to at least one control section of the one or more control sections;
    storing the multiple images and imaging position data associated with the multiple images, wherein the imaging position data for each image indicates relative position, during imaging, of the part with respect to an imaging device;

performing an initial alignment of the CAD drawing with the multiple images of the part;

determining an initial total alignment adjustment based on the initial alignment;

performing one or more alignment iterations until a termination condition is satisfied, wherein each alignment iteration comprises:

for each of the multiple images of the part:

determining a portion of the CAD drawing corresponding to portion of the part visible in that image of the part, and for each control section included in the portion of the CAD drawing:

if an alignment adjustment corresponding to that control section has not been determined during that alignment iteration, locating a measurement point on that image of the part corresponding to that control section; and determining the alignment adjustment between the measurement point and that control section;

changing the total alignment adjustment based on the determined alignment adjustments for that alignment iteration; and determining if the termination condition is satisfied; and providing a user with an indication of a deviation on an output device, wherein the indication is based on the alignment between the CAD drawing and the multiple images.

15. The method of claim 14, wherein the one or more control sections comprise single points at multiple locations.

16. The method of claim 14, wherein the one or more control sections comprise multiple points located along a CAD entity, wherein a spacing between the multiple points is based on a resolution of the multiple images.

17. The method of claim 14, wherein the initial alignment is based on user input received at an input device.

18. The method of claim 14, wherein performing the initial alignment comprises performing the initial alignment automatically using pattern matching.

19. The method of claim 14, wherein locating the measurement point comprises using pattern matching.

20. The method of claim 14, wherein locating the measurement point comprises using a search range corresponding to that control section.

21. The method of claim 14, wherein, if the alignment adjustment corresponding to that control section has been determined during that alignment iteration and a skip parameter is set, the method further comprises performing weighting of the multiple alignment adjustments corresponding to that control section.

22. The method of claim 14, wherein determining the alignment adjustment between the measurement point and that control section comprises determining the alignment adjustment based on a deviation-from-nominal method.

23. The method of claim 14, wherein determining the alignment adjustment between the measurement point and that control section comprises determining the alignment adjustment based on a fit-to-tolerance method.

24. The method of claim 14, wherein the total alignment adjustment includes a translation adjustment and/or a rotation adjustment.

25. The method of claim 14, wherein the alignment iteration termination condition includes a maximum iteration threshold and a minimum total alignment adjustment threshold.

26. The method of claim 14, wherein providing the user with the indication of the deviation comprises verifying, for each control section, if the part is within tolerance bands associated with that control section.

\* \* \* \* \*